United States Patent
Urabayashi

(10) Patent No.: US 11,201,763 B2
(45) Date of Patent: Dec. 14, 2021

(54) COMMUNICATION METHOD AND USER EQUIPMENT

(71) Applicant: KYOCERA CORPORATION, Kyoto (JP)

(72) Inventor: Hiroyuki Urabayashi, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/189,598

(22) Filed: Nov. 13, 2018

(65) Prior Publication Data

US 2019/0081820 A1    Mar. 14, 2019

Related U.S. Application Data

(63) Continuation of application No. PCT/JP2017/018073, filed on May 12, 2017.
(Continued)

(51) Int. Cl.

| | |
|---|---|
| *H04L 25/02* | (2006.01) |
| *H04L 5/00* | (2006.01) |
| *H04W 74/08* | (2009.01) |
| *H04W 72/04* | (2009.01) |
| *H04L 27/00* | (2006.01) |
| *H04W 76/27* | (2018.01) |

(52) U.S. Cl.
CPC .......... *H04L 25/0224* (2013.01); *H04L 5/001* (2013.01); *H04L 5/0048* (2013.01); *H04L 5/0082* (2013.01); *H04L 5/0091* (2013.01); *H04L 27/0006* (2013.01); *H04W 72/042* (2013.01); *H04W 74/0808* (2013.01); *H04L 5/0026* (2013.01); *H04W 72/0446* (2013.01); *H04W 76/27* (2018.02)

(58) Field of Classification Search
CPC . H04L 25/0224; H04L 27/0006; H04L 5/001; H04L 5/0026; H04L 5/0048; H04L 5/0082; H04L 5/0091; H04W 72/042; H04W 72/0446; H04W 74/0808; H04W 76/27

See application file for complete search history.

(56) References Cited

U.S. PATENT DOCUMENTS 7,085,266 B2 * 8/2006 Calvignac ........... G06F 15/7825
370/360
9,112,657 B1 * 8/2015 Song .................... H04L 1/0061
(Continued)

OTHER PUBLICATIONS

LG Electronics; "SRS transmission in LAA"; 3GPP TSG RAN WG1 Meeting #84bis; R1-162467; Apr. 11-15, 2016; Total 4 pages; Busan, South Korea.
(Continued)

*Primary Examiner* — Awet Haile
(74) *Attorney, Agent, or Firm* — Studebaker & Brackett PC

(57) ABSTRACT

A communication method according to one embodiment comprises: transmitting, by a base station that manages a Licensed-Assisted Access (LAA) cell, downlink control information (DCI) to a user equipment, the DCI including subframe information and a transmission instruction of a sounding reference signal in the LAA cell, the subframe information indicates a specific subframe in which the user equipment should transmit the sounding reference signal; and transmitting, by the user equipment, the sounding reference signal to the base station in the specific subframe, based on the DCI.

3 Claims, 28 Drawing Sheets

Related U.S. Application Data

(60) Provisional application No. 62/335,866, filed on May 13, 2016.

(56) References Cited

U.S. PATENT DOCUMENTS

| | | | |
|---|---|---|---|
| 2011/0158152 A1* | 6/2011 | Lu | H04W 72/005 370/312 |
| 2015/0264708 A1 | 9/2015 | Li et al. | |
| 2016/0044644 A1* | 2/2016 | Lyu | H04W 72/042 370/329 |
| 2017/0223640 A1* | 8/2017 | Dinan | H04W 72/0473 |
| 2017/0290040 A1* | 10/2017 | Dinan | H04W 76/27 |
| 2018/0048498 A1* | 2/2018 | Stern-Berkowitz | H04L 27/0006 |
| 2018/0323917 A1* | 11/2018 | Um | H04W 16/14 |
| 2019/0215110 A1* | 7/2019 | Yang | H04L 5/00 |

OTHER PUBLICATIONS

ZTE Microelectronics Technology et al.; "Discussion on SRS design for eLAA UL"; 3GPP TSG RAN WG1 Meeting #84bis; R1-162324; Apr. 11-15, 2016; Total 4 pages; Busan, South Korea.

3rd Generation Partnership Project; "Technical Specification Group Radio Access Network; Study on Licensed-Assisted Access to Unlicensed Spectrum"; 3GPP TR36.889 V13.0.0; Jun. 2015; pp. 1-285; Release 13; 3GPP Organizational Partners.

Ericsson; "Multi-subframe Scheduling Design for Enhanced LAA"; 3GPP TSG-RAN WG1#84BIS; R1-163140; Apr. 11-15, 2016; pp. 1-3; Busan, South Korea.

Nokia et al.; "On LAA UL Scheduling and UL Grant Enhancements"; 3GPP TSG RAN WG1 Meeting #84bis; R1-162784; Apr. 11-15, 2016; pp. 1-9; Busan, South Korea.

* cited by examiner

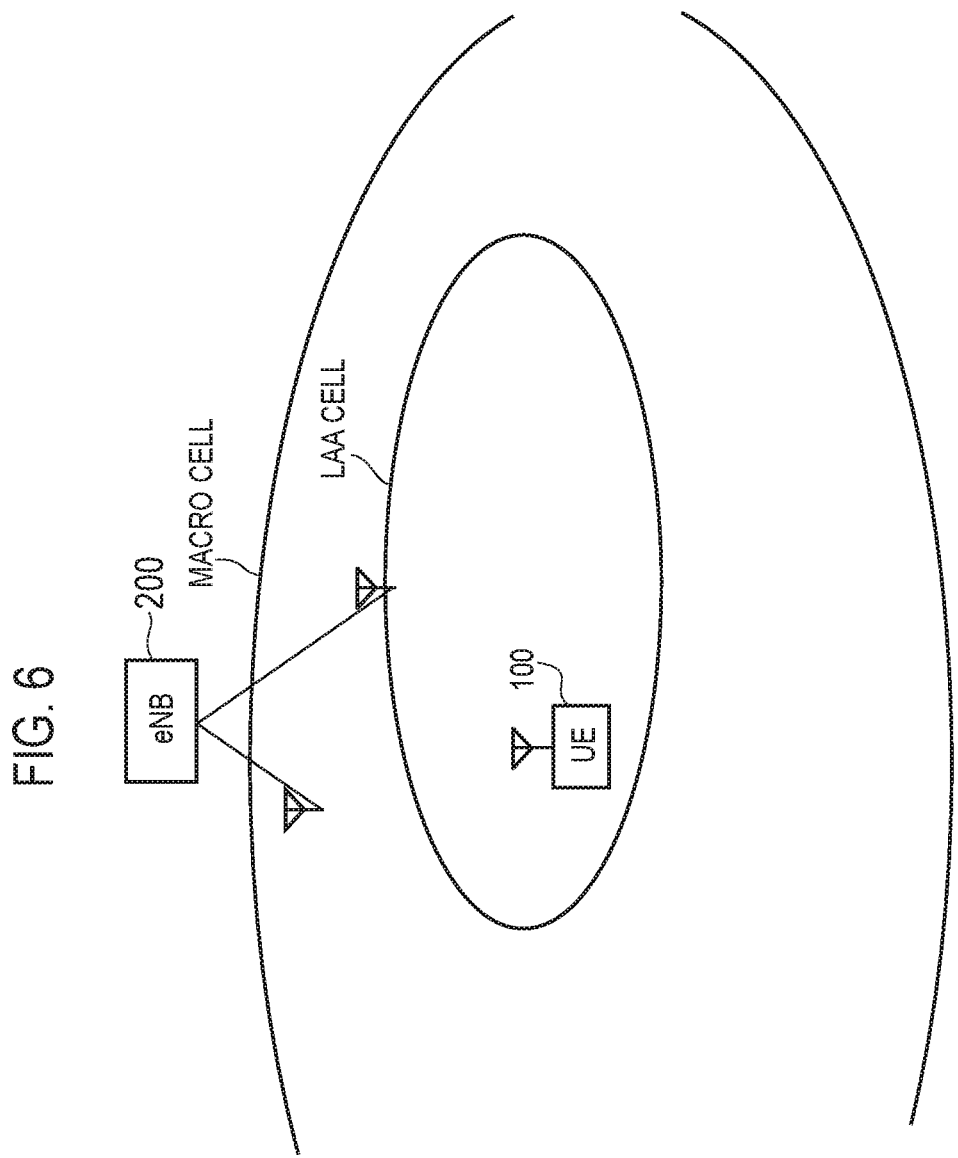

FIG. 7

| FIELD | BITs |
|---|---|
| COMMON TO ALL SUBFRAME | |
| CARRIER INDICATOR | 3 |
| RB ASSIGNMENT | 10 |
| TPC | 2 |
| CYCLIC SHIFT FOR DMRS | 3 |
| CSI REQUEST | 1 |
| SRS REQUEST | 1 |
| SCHEDULED SUBFRAME | 4 |
| SUBFRAME SPECIFIC | |
| SUBFRAME INDEX #0 | |
| MCS | 5 |
| RV | 2 |
| HARQ PROCESS ID | 4 |
| NDI | 1 |
| BLANK OPTION(PUSCH LENGTH) | 2 |
| SUBFRAME INDEX #1 | |
| MCS | 5 |
| RV | 2 |
| HARQ PROCESS ID | 4 |
| NDI | 1 |
| BLANK OPTION(PUSCH LENGTH) | 2 |
| RNTI / CRC | 16 |
| TOTAL | 68 |

G1: CARRIER INDICATOR through SCHEDULED SUBFRAME
G2: SUBFRAME INDEX #0 group
G3: SUBFRAME INDEX #1 group

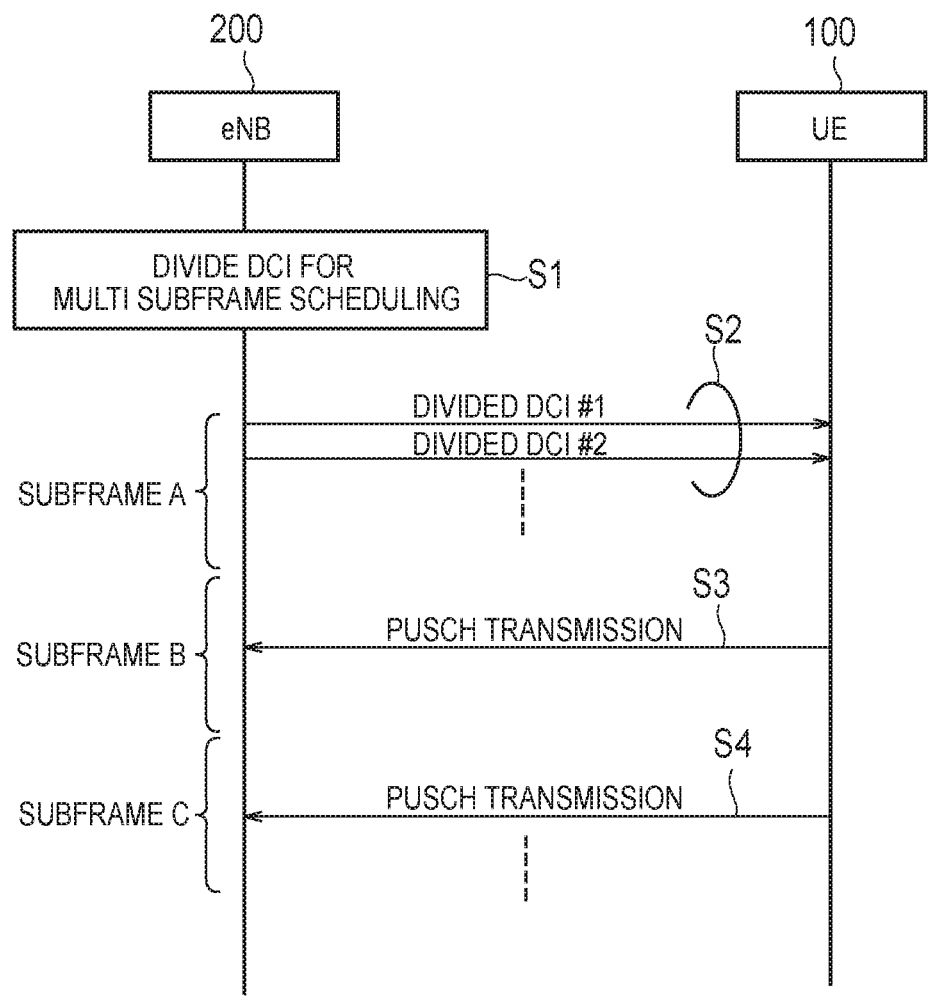

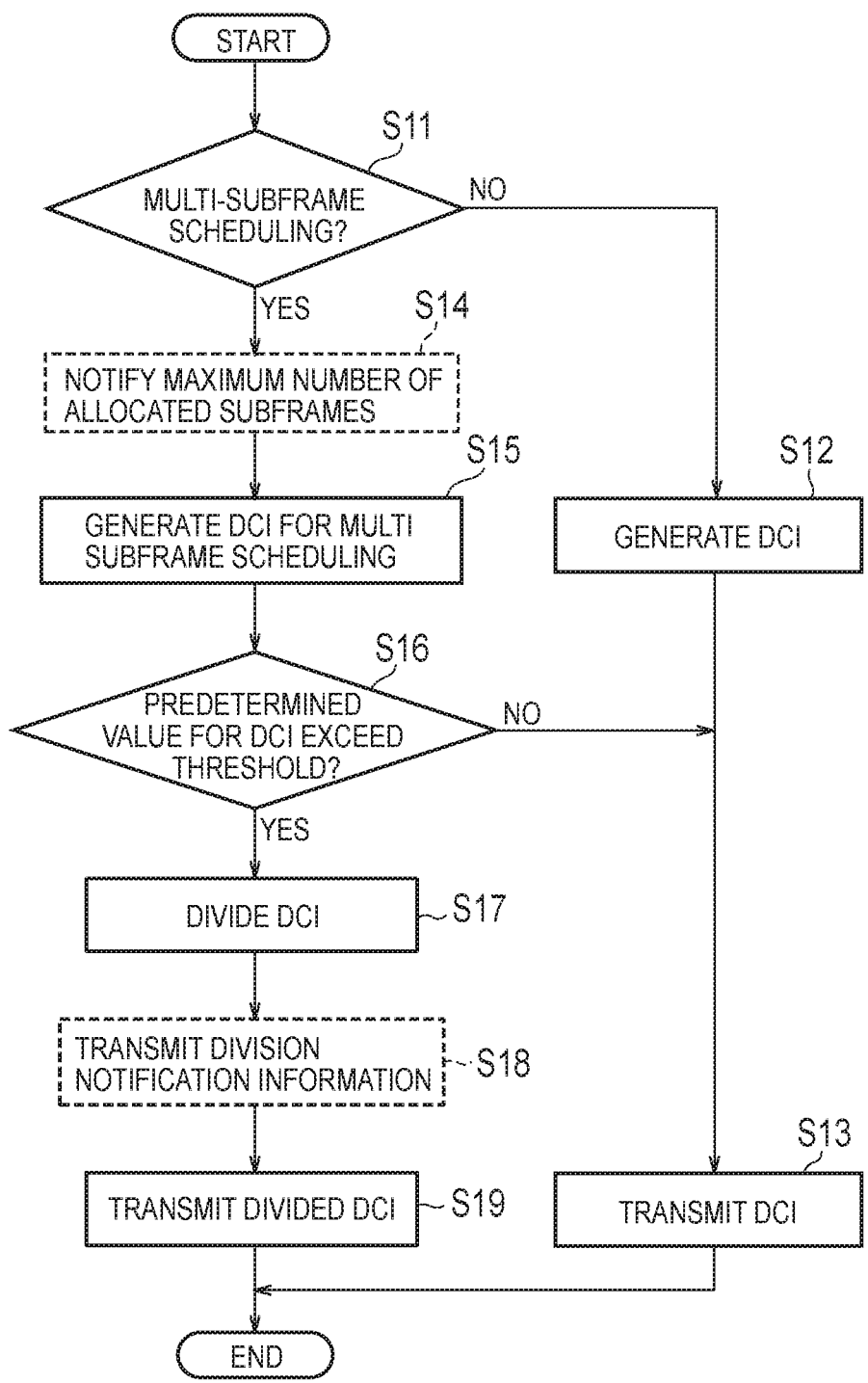

FIG. 10

| FIELD | BITs | COMMENT |
|---|---|---|
| COMMON TO ALL SUBFRAME | 32 | |
| CARRIER INDICATOR | 3 | |
| RB ASSIGNMENT | 10 | BIT MAP FOR 10RB INTERLACE |
| TPC | 2 | |
| CYCLIC SHIFT FOR DMRS AND OCC INDEX | 3 | |
| CSI REQUEST | 1 | |
| SRS REQUEST | 1 | |
| MCS | 5 | |
| SCHEDULED SUBFRAME | 4 | |
| LBT PARAMETER | 3 | |
| SUBFRAME SPECIFIC INFROMATION | 9 | |
| RV | 2 | |
| HARQ PROCESS ID | 4 | 16 PROCESS ID |
| NDI | 1 | LEGACY NDI |
| BLANK OPTION | 2 | BLANK POSITION OF PUSCH |

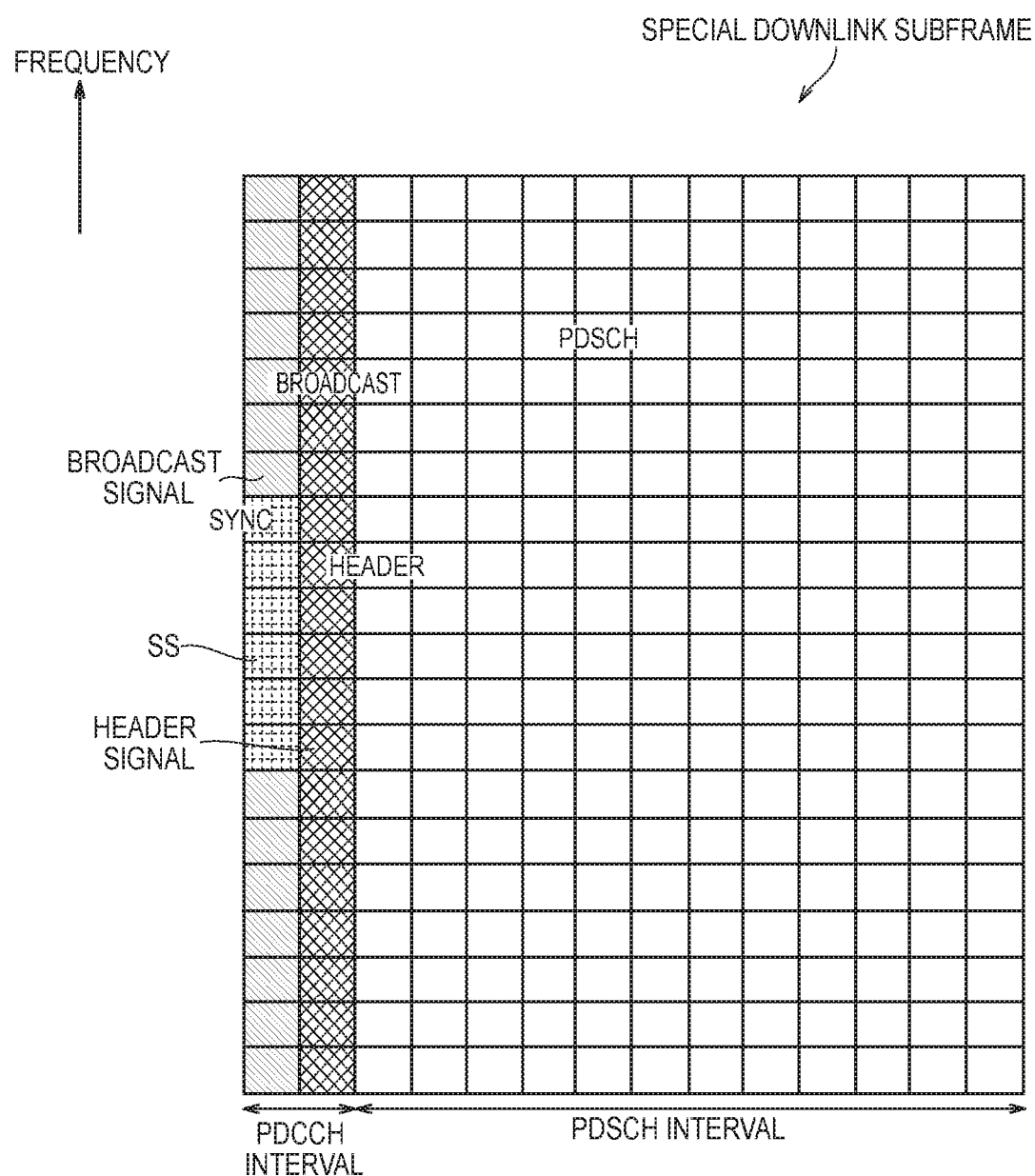

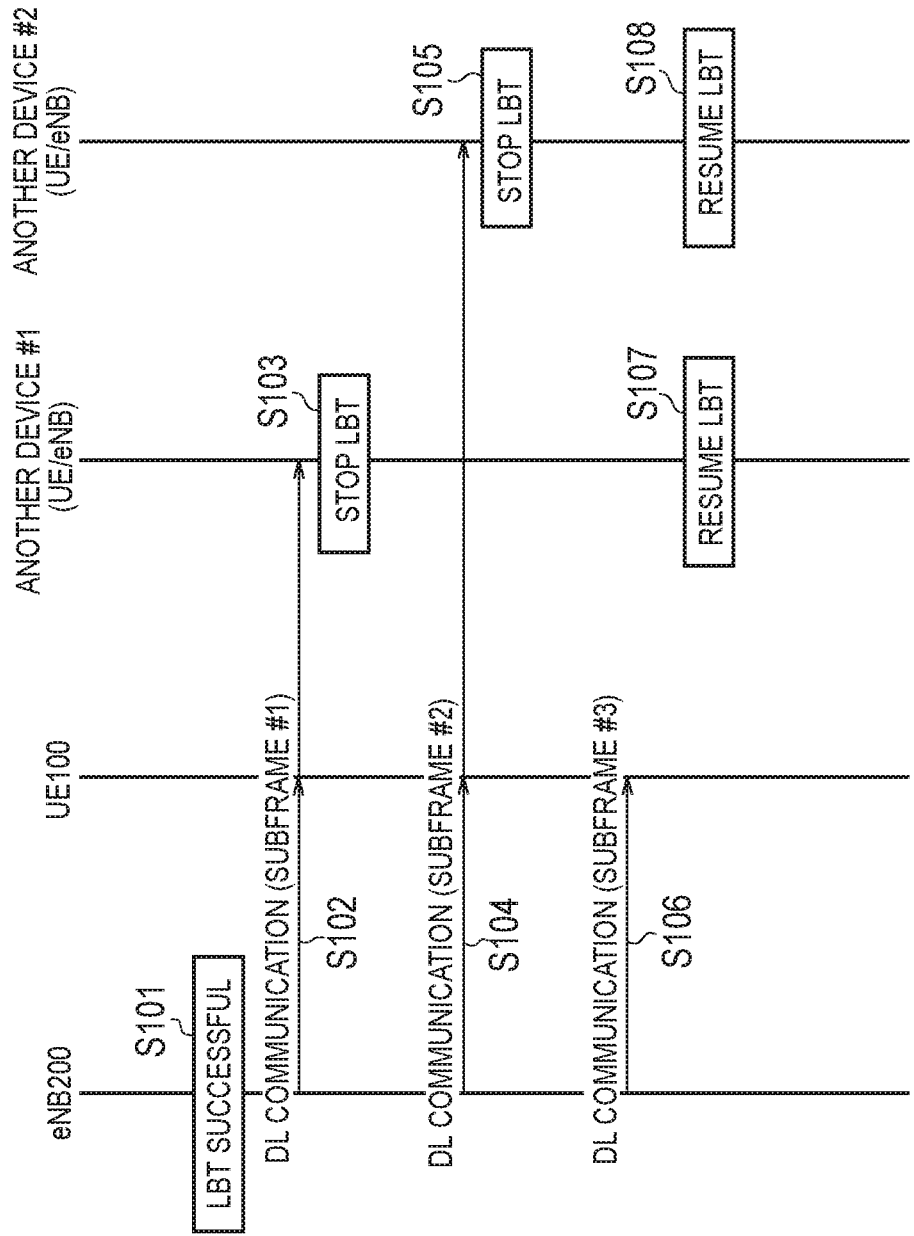

COMMUNICATION METHOD AND USER EQUIPMENT

CROSS-REFERENCE TO RELATED APPLICATION

The present application is a continuation based on PCT Application No. PCT/JP2017/018073 filed on May 12, 2017, which claims the benefit of U.S. provisional application No. 62/335,866 (filed May 13, 2016). The content of which is incorporated by reference herein in their entirety.

FIELD

The present invention relates to a base station and a radio terminal used in a mobile communication system.

BACKGROUND

In 3GPP (3rd Generation Partnership Project) which is a project aiming to standardize a mobile communication system, LAA (Licensed-Assisted Access) has been introduced. LAA is a technology in which at least one secondary cell (SCell) operating in an unlicensed spectrum is used in carrier aggregation. Such an SCell is referred to as "LAA SCell". The unlicensed spectrum may be referred to as an "unlicensed frequency band (unlicensed band)".

The introduction of multi-subframe scheduling in LAA is being examined. Multi-subframe scheduling is a scheduling method in which a base station collectively allocates a plurality of subframes to a radio terminal for radio communication between the base station and the radio terminal. The base station transmits downlink control information (DCI) for multi-subframe scheduling to the radio terminal.

Such DCI for multi-subframe scheduling is supposed to have a longer bit length than general DCI, that is, DCI for single subframe scheduling. However, since there is a limit to the bit length of one DCI to be transmitted from the base station to the radio terminal, it is difficult to properly transmit DCI for multi-subframe scheduling.

Further, in a mobile communication system, to respond to rapidly increasing traffic demands, a use of a specific frequency band shared by a plurality of operators and/or a plurality of communication systems for radio communication has been discussed (see Non Patent Document 1, for example). The specific frequency band is, for example, a frequency band not requiring the above license (an unlicensed band).

To avoid interference with another operator and/or another communication system, a base station and a radio terminal configured to perform radio communication by using such a specific frequency band are required to perform a clear channel determination process referred to as listen-before-talk (LBT).

The LBT is a procedure in which it is determined, based on a received signal strength (interference power), whether or not a target channel in a specific frequency band is free, and only if the target channel is determined to be a clear channel, the target channel is used.

PRIOR ART DOCUMENT

Non-Patent Document

Non Patent Document 1: 3GPP technical report "TR 36.889 V13.0.0" June 2015

SUMMARY

A base station according to one embodiment performs radio communication with a radio terminal. The base station comprises a controller configured to perform multi-subframe scheduling for collectively allocating a plurality of subframes to the radio terminal for the radio communication. The controller notifies the radio terminal, by dedicated RRC signaling, of a maximum number of subframes that can be collectively allocated to the radio terminal by the multi-subframe scheduling.

A base station according to one embodiment performs radio communication with a radio terminal. The base station comprises a controller configured to perform multi-subframe scheduling for collectively allocating a plurality of subframes to the radio terminal for the radio communication. The controller divides downlink control information for the multi-subframe scheduling, and transmits the divided downlink control information to the radio terminal within one subframe.

A radio terminal according to one embodiment performs radio communication with a base station. The radio terminal comprises a controller configured to perform a process of receiving, from the base station, downlink control information for multi-subframe scheduling. In the multi-subframe scheduling, a plurality of subframes are collectively allocated from the base station to the radio terminal for the radio communication. The controller performs a process of receiving the downlink control information divided by the base station within one subframe.

A base station according to one embodiment performs radio communication with a radio terminal in a specific frequency band shared by a plurality of operators and/or a plurality of communication systems. The base station comprises a controller configured to perform downlink transmission across a plurality of consecutive subframes. The controller performs a process of transmitting downlink control information (DCI) to a radio terminal in a target subframe among the plurality of consecutive subframes. The DCI includes subframe information related to subframes subsequent to the target subframe among the plurality of consecutive subframes.

A radio terminal according to one embodiment performs radio communication with a base station in a specific frequency band shared by a plurality of operators and/or a plurality of communication systems. The radio terminal comprises a controller configured to perform a process of receiving downlink control information (DCI) in a target subframe among a plurality of consecutive subframes, from the base station configured to perform downlink transmission in the specific frequency band across the plurality of subframes. The DCI includes subframe information related to subframes subsequent to the target subframe among the plurality of subframes.

BRIEF DESCRIPTION OF THE DRAWINGS

FIG. 6 is a diagram illustrating an application scenario according to the embodiment A.

FIG. 7 is a list showing an example of DCI for multi-subframe scheduling according to the embodiment A.

FIG. 8 is a diagram illustrating an outline of an operation sequence according to the embodiment A.

FIG. 9 is a diagram illustrating an operation flow of an eNB according to the embodiment A.

FIG. 10 is a diagram according to an additional remark 1.

FIG. 25 is a diagram illustrating a configuration example of a special downlink subframe according to a modification of the embodiment B-3.

FIG. 27 is a sequence chart illustrating an example of an operation according to the embodiment B-4.

DESCRIPTION OF THE EMBODIMENT

Embodiment A (Configuration of Mobile Communication System)

Figure 1:
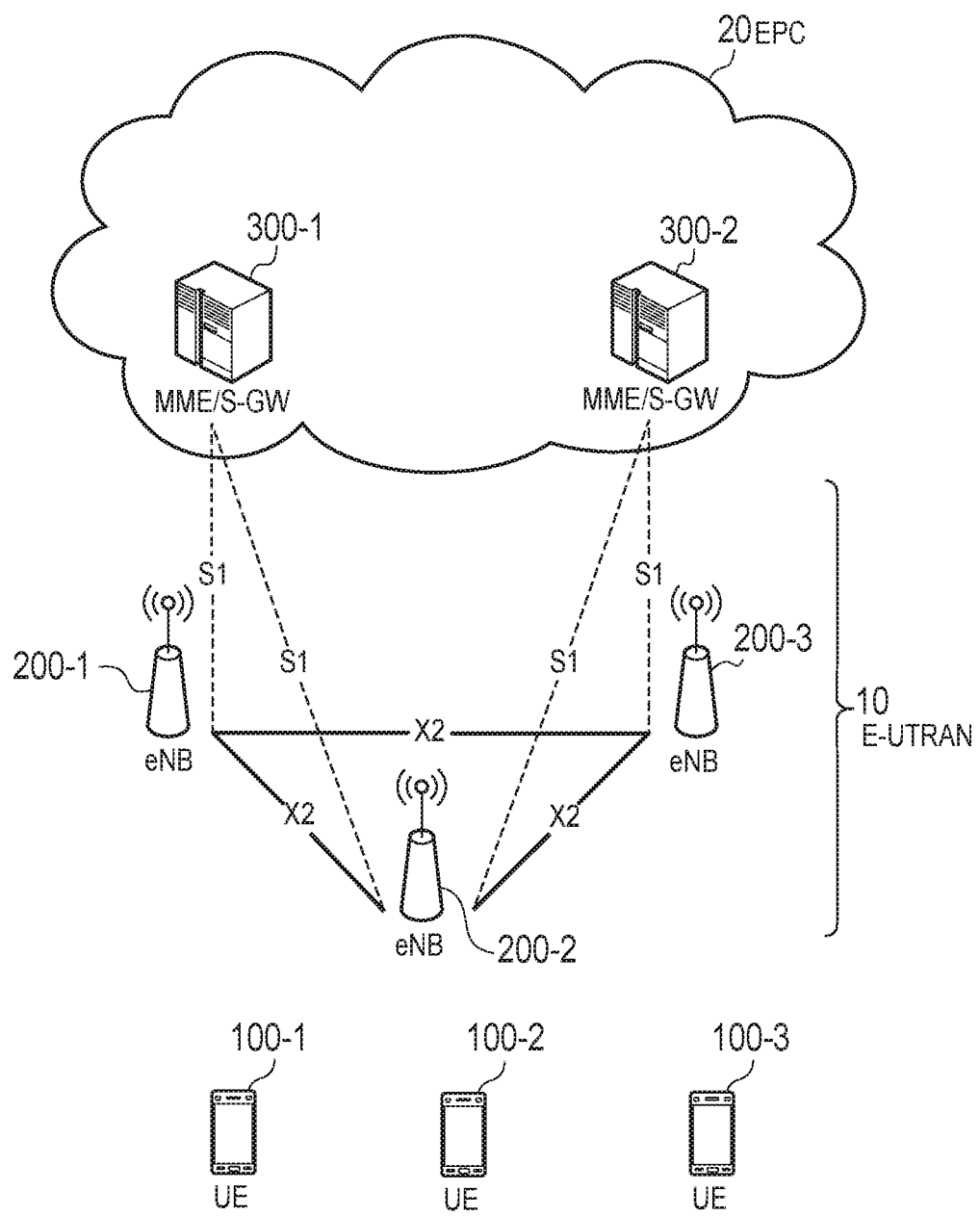
FIG. 1 is a diagram illustrating a configuration of an LTE system according to an embodiment A.

The configuration of the mobile communication system according to the embodiment A will be described. FIG. 1 is a diagram illustrating a configuration of an LTE (Long Term Evolution) system which is a mobile communication system according to the embodiment A. The LTE system is a mobile communication system based on the 3GPP standard.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell).

The E-UTRAN 10 corresponds to a radio access network. The E-UTRAN 10 includes a plurality of eNBs (evolved Node-Bs) 200. The eNB 200 corresponds to a base station. The eNBs200 are connected mutually via an X2 interface.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface.

Figure 2:
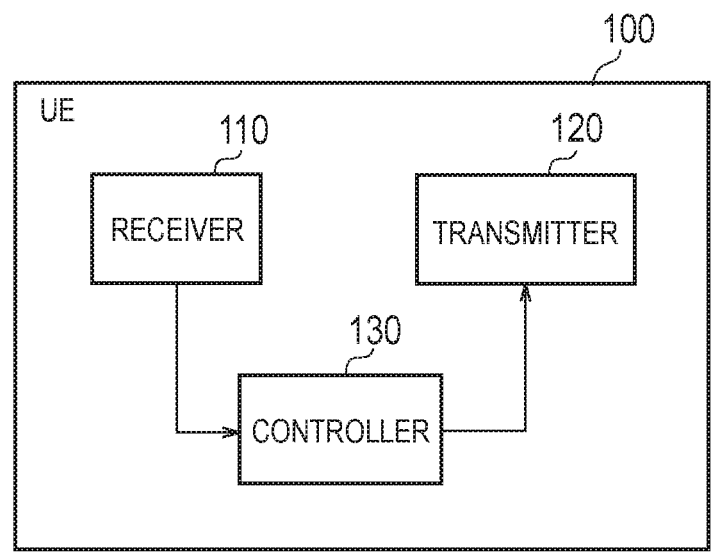
FIG. 2 is a diagram illustrating a configuration of a UE (radio terminal) according to an embodiment A.

FIG. 2 is a diagram illustrating a configuration of the UE 100 (radio terminal). As illustrated in FIG. 2, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The number of processors may be one. The number of processors may be two or more. The processor executes below-described processes.

Figure 3:
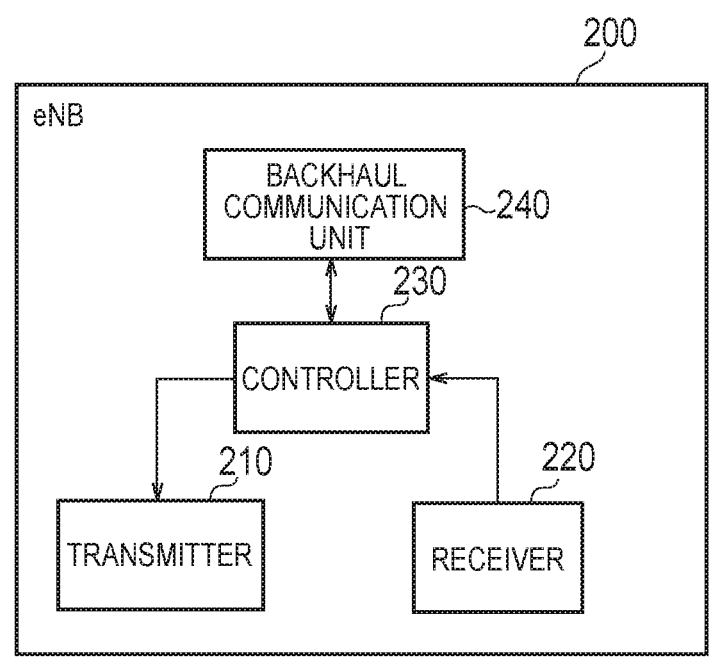
FIG. 3 is a diagram illustrating a configuration of an eNB (base station) according to the embodiment A.

FIG. 3 is a diagram illustrating a configuration of the eNB 200 (base station). As illustrated in FIG. 3, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The number of processors may be one. The number of processors may be two or more. The processor executes below-described processes.

The backhaul communication unit 240 is connected to a neighboring eNB 200 via the X2 interface and is connected to the MME/S-GW 300 via the S1 interface. The backhaul communication unit 240 is used for communication performed on the X2 interface, communication performed on the S1 interface, and the like.

Figure 4:
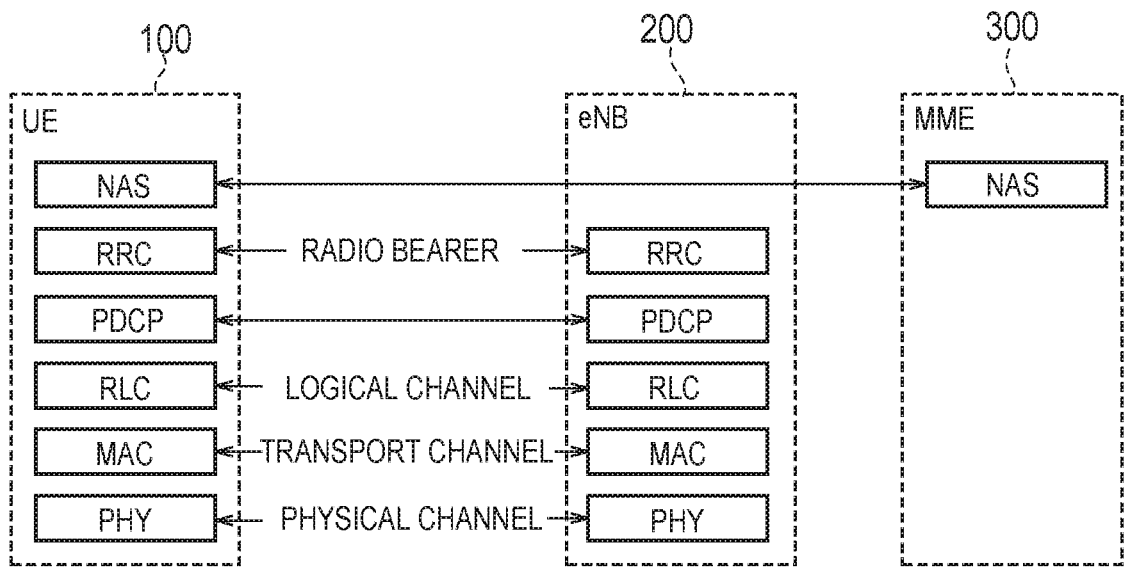
FIG. 4 is a diagram illustrating a configuration of a protocol stack of a radio interface according to the embodiment A.

FIG. 4 is a diagram illustrating a configuration of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control information are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control information are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control information are transmitted via a logical channel.

The PDCP layer performs header compression and decompression, and encryption and decryption.

The RRC layer is defined only in a control plane dealing with control information. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

Figure 5:
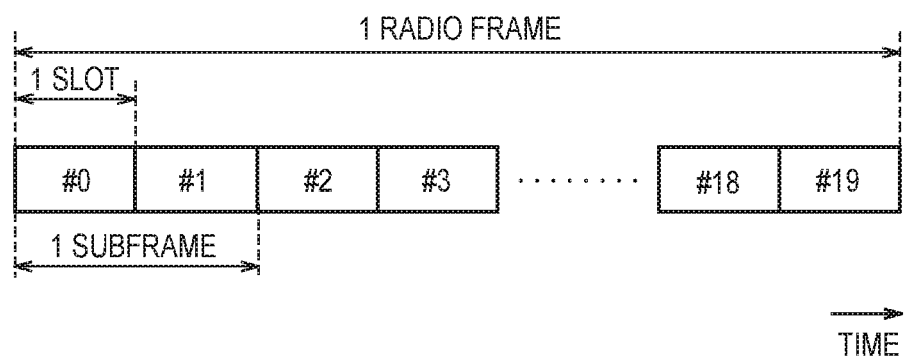
FIG. 5 is a diagram illustrating a configuration of a radio frame according to the embodiment A.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a region used as a physical downlink control channel (PDCCH) for mainly transmitting control information. The other portion of each subframe is a region available as a physical downlink shared channel (PDSCH) for mainly transmitting downlink data.

In general, the eNB 200 uses the PDCCH to transmit downlink control information (DCI) to the UE 100. In general, the eNB 200 uses the PDSCH to transmit the downlink data to the UE 100. The DCI carried by the PDCCH includes uplink scheduling information, downlink scheduling information, and a TPC command. The uplink scheduling information is scheduling information related to an allocation of an uplink radio resource (UL grant), and the downlink scheduling information is scheduling information related to an allocation of a downlink radio resource. The TPC command is information for instructing an increase or decrease in the uplink transmission power. In order to identify a UE 100 to which the DCI is transmitted, the eNB 200 includes, into the DCI, a CRC bit scrambled by an identifier (RNTI: Radio Network Temporary ID) of the UE 100 to which the DCI is transmitted. Each UE 100 descrambles, by the RNTI of the UE 100, the CRC bit of the DCI that may be addressed to the UE 100, and then, performs CRC checking, so as to perform blind decoding of the PDCCH. As a result, each UE 100 detects the DCI addressed to the UE 100. The PDSCH carries the downlink data by the downlink radio resource (resource block) indicated by the downlink scheduling information.

A PDCCH radio resource is allocated by using a radio resource unit called control channel element (CCE). One, two, four or eight CCEs are allocated. This CCE number corresponds to aggregation level. DCI is encoded with an error correction code, but its coding rate is determined so as to decrease as the number of CCEs allocated to the PDCCH increases. In the PDCCH region, the width in the frequency direction is fixed by the system bandwidth, but the time direction is variable from one to three OFDM symbols. The UE 100 performs blind decoding on the OFDM symbol for PDCCH. The range in which the UE 100 performs blind decoding (a set of CCE numbers) is called a search space. In the search space, there are a common search space common to a plurality of UEs 100 and a UE specific search space different for each UE 100.

In the uplink, both ends in the frequency direction of each subframe are control regions used as a physical uplink control channel (PUCCH) for mainly transmitting an uplink control information. The other portion of each subframe is a region available as a physical uplink shared channel (PUSCH) for mainly transmitting uplink data.

In general, the UE 100 uses the PUCCH to transmit uplink control information (UCI) to the eNB 200. In general, the UE 100 uses the PUSCH to transmit the uplink data to the eNB 200. The UCI carried by the PUCCH includes a CQI (Channel Quality Indicator), a PMI (Precoding Matrix Indicator), an RI (Rank Indicator), a scheduling request (SR), and a HARQ ACK/NACK. The CQI is an index indicating a downlink channel quality and is used for deciding an MCS to be used for the downlink transmission, for example. The PMI is an index indicating a precoder matrix desirably used for the downlink transmission. The RI is an index indicating the number of layers (the number of streams) available for the downlink transmission. The SR is information for requesting an allocation of a PUSCH resource. The HARQ ACK/NACK is delivery acknowledgment information indicating whether or not the downlink data is correctly received.

(Application Scenario)

An application scenario according to an embodiment A will be described. FIG. 6 is a diagram illustrating the application scenario according to the embodiment A.

As illustrated in FIG. 6, the eNB 200 manages a macro cell and an LAA cell. The macro cell operates in a licensed spectrum. The LAA cell operates in an unlicensed spectrum. The licensed spectrum is a frequency band for which the license is granted to operators, and the unlicensed spectrum is a frequency band for which the license is not granted to operators. FIG. 6 illustrates an example in which the LAA cell is a small cell.

The UE 100 is located in an overlapping region of the macro cell and the LAA cell. The UE 100 is in an RRC connected mode on the macro cell. The UE 100 is configured to perform LAA communication. Specifically, the UE 100 performs carrier aggregation communication where the macro cell is set as a primary cell (PCell) and the LAA cell is set as a secondary cell (PCell). That is, the UE 100 is allocated with both a radio resource of the macro cell and a radio resource of the LAA cell. A radio resource of the macro cell is allocated through PDCCH of the macro cell. On the other hand, a radio resource of the LAA cell may be allocated through PDCCH of the LAA cell. A radio resource of the LAA cell may be allocated through PDCCH of the macro cell. The latter allocation method is referred to as "cross carrier scheduling".

The mobile communication system according to the embodiment A supports an uplink (UL) LAA in addition to a downlink (DL) LAA. That is, the mobile communication system according to the embodiment A supports DL transmission and UL transmission using the unlicensed spectrum.

The unlicensed spectrum is a frequency band shared among a plurality of communication systems and/or a plurality of operators, and thus, LBT (Listen-Before-Talk) is obligatory. Specifically, a device using the unlicensed spectrum monitors/senses a channel on the LAA cell to determine whether the channel is free or busy. The device, upon determining that the channel is free (that is, if LBT is successful), performs transmission, and otherwise, does not perform the transmission. If LBT is successful, the device is allowed to occupy the channel for a predetermined duration.

(Multi-Subframe Scheduling)

The multi-subframe scheduling according to the embodiment A will be described.

In the embodiment A, an example of introducing multi-subframe scheduling into LAA will be described. Multi-subframe scheduling is a scheduling method in which the eNB 200 collectively allocates a plurality of subframes to the UE 100 for radio communication between the eNB 200 and the UE 100. The eNB 200 transmits DCI for multi-subframe scheduling to the UE 100. The eNB 200 transmits the DCI through PDCCH. Alternatively, the eNB 200 may transmit the DCI through EPDCCH (Enhanced PDCCH).

In the embodiment A, an example of scheduling uplink transmission (PUSCH transmission) on the LAA cell by using multi-subframe scheduling will be described. The eNB 200 allocates, to the UE 100, a plurality of subframes for the PUSCH transmission by using multi-subframe scheduling. In this case, DCI for multi-subframe scheduling includes uplink scheduling information corresponding to the plurality of subframes.

FIG. 7 is a list showing an example of DCI for multi-subframe scheduling according to the embodiment A.

As shown in FIG. 7, the DCI for multi-subframe scheduling includes a portion common to a plurality of subframes (Common to all subframes), and a portion specific to each of the plurality of subframes (Subframe specific).

The portion common to the plurality of subframes ("G1" in FIG. 7) has the following fields. However, some of the following fields may be included in the portion specific to a subframe, and not in the common portion.

"Carrier Indicator" (3 bits) indicating an uplink allocation carrier

"RB assignment" (10 bits) indicating an uplink allocation resource block (RB)

"TPC" (2 bits) being an uplink power control command

"Cyclic shift for DMRS" (3 bits) indicating cyclic shift for an uplink DMRS (demodulation reference signal)

"CSR request" (1 bit) requesting transmission of CSI (Channel State Information)

"SRS request" (1 bit) requesting transmission of an SRS (Sounding Reference Signal)

"Scheduled subframe" (4 bits) indicating an uplink allocation subframe

Next, the portion specific to a subframe has the following fields. However, some of the following fields may be included in the portion common to the plurality of subframes, and not in the specific portion. For example, the following MCS may be included in the portion common to the plurality of subframes.

"MCS" (5 bits) indicating uplink MCS

"RV" (2 bits) indicating a redundant version (RV) of uplink HARQ

"HARQ process ID" (4 bits) indicating a process of uplink HARQ

"NDI" (1 bit) indicating whether or not data is initial transmission data

"Blank option" (2 bits) indicating a symbol considered as blank during PUSCH transmission (for example, the first symbol and/or the last symbol)

In FIG. 7, a case in which two subframes are allocated to the UE 100 is illustrated. For this reason, the portion specific to a subframe includes a portion corresponding to one subframe (Subframe index #0) ("G2" in FIG. 7), and a portion corresponding to another subframe (Subframe index #1) ("G3" in FIG. 7). The index of the subframe (Subframe index) is described for the convenience of explanation, and may not be included in the portion specific to a subframe. In this case, the index of the subframe can be implicitly identified based on the arrangement order of "G2" and "G3". However, as will be described in detail later, if "G2" and "G3" are divided to be transmitted, the explicit identification of the index of the subframe may be enabled by including the index of the subframe into the portion specific to a subframe. Alternatively, if "G2" and "G3" are divided to be transmitted, the implicit identification of the index of the subframe may be enabled based on the arrangement order of "G2" and "G3".

In addition to the portion common to a plurality of subframes and the portion specific to a subframe, the DCI for multi-subframe scheduling includes CRC (Cyclic Redundancy Check) scrambled by an RNTI. However, as will be described in detail later, if the DCI for multi-subframe scheduling is divided to be transmitted, CRC scrambled by an RNTI may be included in each divided DCI.

In the example shown in FIG. 7, the bit length of the DCI for multi-subframe scheduling is 68 bits in total. Here, as the number of subframes allocated to the UE 100 increases, the portion specific to a subframe increases. Therefore, the bit length of the DCI for multi-subframe scheduling changes in accordance with the number of subframes allocated to the UE 100.

However, there is a limit to the bit length of one DCI transmitted from the eNB 200 to the UE 100. There is a problem in that as the number of subframes allocated to the UE 100 increases, the bit length of the DCI exceeds the limit. As the bit length increases, the redundancy of the DCI for multi-subframe scheduling decreases (that is, the coding rate increases). That is, there is a problem in that the error resilience decreases.

(Outline of an Operation Sequence)

An outline of an operation sequence according to the embodiment A will be described. FIG. 8 is a diagram illustrating an outline of an operation sequence according to the embodiment A. Here, a case in which the eNB 200 performs PUSCH scheduling on the LAA cell is assumed.

As illustrated in FIG. 8, in step S1, the eNB 200 divides the DCI for multi-subframe scheduling. The eNB 200 may divide the DCI upon a predetermined value related to the DCI for multi-subframe scheduling exceeding a threshold value. The predetermined value is any one of the number of subframes allocated to the UE 100, a bit length of the DCI for multi-subframe scheduling, and a coding rate of the DCI for multi-subframe scheduling.

In step S2, the eNB 200 transmits a plurality of divided DCIs to the UE 100 within one subframe (subframe A). For example, the eNB 200 arranges the plurality of divided DCIs in a UE-specific search space of the PDCCH. The eNB 200 may transmit the plurality of divided DCIs on the LAA cell. The UE 100 receives the DCIs divided by the eNB 200 within one subframe. The UE 100, based on the received plurality of divided DCIs, grasps the scheduling of the uplink (PUSCH).

In step S3, the UE 100 performs PUSCH transmission in a subframe B allocated from the eNB 200. In step S4, the UE 100 performs PUSCH transmission in a subframe C allocated from the eNB 200. The UE 100 may, if the PUSCH transmission is performed on the LAA cell, perform LBT before the PUSCH transmission. The UE 100 may perform the PUSCH transmission only if the LBT is successful.

As described above, the eNB 200 divides DCI for multi-subframe scheduling to be transmitted to the UE 100. This makes it possible to shorten the bit length of each divided DCI transmitted from the eNB 200 to the UE 100, and thus resolve the problem described above.

(Operation Flow)

An operation flow of the eNB 200 according to the embodiment A will be described. FIG. 9 is a diagram illustrating an operation flow of the eNB 200 according to the embodiment A. In FIG. 9, processes that can be omitted are indicated by broken lines.

As illustrated in FIG. 9, in step S11, the eNB 200 determines whether or not to perform multi-subframe scheduling. For example, if a buffer length corresponding to the UE 100 is equal to or above a fixed length (that is, if a burst transmission having a fixed length is necessary), the eNB 200 may determine to perform multi-subframe scheduling. On the other hand, if the buffer length corresponding to the UE 100 is less than a fixed length (that is, if a burst transmission having a fixed length is not necessary), the eNB 200 may determine not to perform multi-subframe scheduling. If multi-subframe scheduling is not performed (step S11: NO), the eNB 200 generates general DCI (that is, DCI for single subframe scheduling), and transmits the general DCI to the UE 100 (steps S12 and S 13).

If multi-subframe scheduling is performed (step S11: YES), the eNB 200 may notify the UE 100 of the maximum number of subframes that can be allocated to the UE 100 by the multi-subframe scheduling. The eNB 200 may perform the notification by RRC signaling. The RRC signaling may be broadcast RRC signaling. The RRC signaling may be UE-specific RRC signaling. The broadcast RRC signaling may be SIB (System Information Block). The UE 100 may, based on the notification, determine that multi-subframe scheduling is performed. The UE 100 may determine to perform blind decoding of the PDCCH until the maximum number of the notified subframes is reached. The eNB 200 may, after the notification, transmit an instruction to the UE 100 to validate or invalidate the setting contents of the notification. The instruction may be performed through DCI. The DCI may be DCI common to a plurality of UEs. The DCI may be DCI specific to a UE.

In step S15, the eNB 200 generates DCI for multi-subframe scheduling (see FIG. 7).

In step S16, the eNB 200 compares a predetermined value related to the DCI for multi-subframe scheduling with a threshold value. The predetermined value is any one of the number of subframes allocated to the UE 100, a bit length of the DCI for multi-subframe scheduling, and a coding rate of the DCI for multi-subframe scheduling. If the predetermined value does not exceed the threshold value (step S16: NO), the eNB 200 does not divide the DCI to be transmitted to the UE 100 (step S13).

On the other hand, if the predetermined value exceeds the threshold value (step S16: YES), then in step S17, the eNB 200 divides the DCI for multi-subframe scheduling. The eNB 200 may dynamically determine the number of divisions so as to be equal to or less than a fixed coding rate. Alternatively, the eNB 200 may apply a fixed number of divisions defined beforehand. As an example, if the maximum number of allocated subframes is four, a rule (table) by which the number of divisions is fixed to 2 is defined in advance. In this case, the UE 100 and the eNB 200 may hold the rule (table) in advance.

For example, if the DCI shown in FIG. 7 is divided into three, the eNB 200 is divided into the three portions "G1", "G2", and "G3" shown in FIG. 7. If the DCI shown in FIG. 7 is divided into two, the eNB 200 is divided into the two portions "G1+G2" and "G3" shown in FIG. 7. Alternatively, if the DCI shown in FIG. 7 is divided into two, the eNB 200 may be divided into the two portions "G1" and "G2+G3" shown in FIG. 7. However, if the reception of the portion (G1) common to a plurality of subframes fails, there is a high possibility that the UE 100 will not be able to perform transmission in all subframes. Therefore, it is preferable that transmission is performed by separating the portion (G1) common to a plurality of subframes from the portion (G2+G3) specific to a subframe. As a result, more resources can be allocated to the portion (G1) common to a plurality of subframes, so that redundancy can be secured.

In step S18, the eNB 200 transmits division notification information related to the divided DCI, to the UE 100. The division notification information includes at least one of information indicating the number of allocated subframes, the number of divisions of the DCI, and an upper-limit value and/or lower-limit value of the number of allocated subframes. The UE 100 may, based on the division notification information, determine that multi-subframe scheduling is performed. The UE 100 may, based on the division notification information, determine the number of divided DCIs that should be acquired by blind decoding. The UE 100 may terminate the blind decoding in response to the acquisition of a fixed number of DCIs (divided DCIs). As a result, the processing load on the UE can be reduced.

The eNB 200 may transmit the division notification information by RRC signaling. The RRC signaling may be broadcast RRC signaling. The RRC signaling may be UE-specific RRC signaling. The broadcast RRC signaling may be SIB.

Alternatively, the eNB 200 may transmit the division notification information through DCI common to a plurality of UEs. In this case, the eNB 200 may arrange the division notification information in the common search space of the PDCCH.

Alternatively, the eNB 200 may transmit the division notification information through DCI specific to a UE. In this case, the eNB 200 may arrange the division notification information in the UE-specific search space of the PDCCH. The eNB 200 may transmit the divided DCI while including the division notification information therein (step S19). In this case, the eNB 200 may include the division notification information into the divided DCI corresponding to the portion (G1) common to the plurality of subframes. The UE 100 may determine, based on the division notification information included in the DCI successfully received, whether DCI (divided DCI) addressed to the UE 100 exists in the same frame in addition to the received DCI.

In step S19, the eNB 200 transmits a plurality of divided DCIs to the UE 100. The eNB 200 includes CRC scrambled by an RNTI of the UE 100 into each divided DCI. The UE 100 performs blind decoding of each divided DCI by using the RNTI, and acquires the information from each divided DCI.

The eNB 200 arranges each divided DCI at a different candidate position. Each candidate position includes a number of CCEs in accordance with the aggregation level. As an example, in a case of transmitting two divided DCIs (divided DCI #1, divided DCI #2), if the aggregation level is 2, two CCEs are allocated to the divided DCI #1, and two different CCEs are allocated to the divided DCI #2. The UE 100 performs blind decoding on each candidate position and attempts to acquire each divided DCI.

It is preferable that the eNB 200 brings a candidate position where one divided DCI is arranged, and a candidate position where another divided DCI is arranged adjacent to each other. Since each candidate position is determined, by arranging each divided DCI adjacent to each other, it is possible to reduce a range for the UE 100 to perform blind decoding (that is, reduce the number of unnecessary decoding). As an example, based on the status of division of the DCI, the UE 100, in a case that the blind decoding is successful at the candidate position of the divided DCI #1, may determine that the divided DCI #2 is always arranged at the next candidate position. However, if the next candidate position is occupied with a different signal, the eNB 200 arranges the DCI #2 at a candidate position after next, and the UE 100 performs the blind decoding for the candidate position after next.

Modification of Embodiment A

A modification of the embodiment A will be described.

In the above-described embodiment A, it is assumed that a threshold value compared with a predetermined value related to DCI for multi-subframe scheduling (see step S16 in FIG. 9) is fixed. However, the eNB 200 may determine a threshold value based on the number of CCEs used to transmit DCI (that is, the aggregation level). For example, the eNB 200 may increase a threshold value as the number of CCEs used to transmit DCI increases.

The eNB 200 may determine the aggregation level based on a predetermined value related to DCI for multi-subframe scheduling. For example, the eNB 200 may increase the number of CCEs used to transmit DCI as the number of allocated subframes increases. The conventional maximum number of CCEs (maximum aggregation level) is 8, but the maximum number of CCEs may be expanded to a number more than 8.

The eNB 200 may notify, to the UE 100, the aggregation level (or the maximum value or the minimum value thereof) thus determined. Alternatively, the minimum number of allocated subframes may be notified beforehand, and the UE 100 may determine the minimum aggregation level. The notification method similar to that in the embodiment A described above may be employed. The UE 100 may, based on the notification, determine the number of CCEs to be subjected to blind decoding. For example, if the aggregation level is greater than 1, the UE 100 may exclude the aggregation level 1 from the subject of blind decoding.

In the embodiment A described above, an example is described where an unlicensed spectrum is used as the SCell while it is assumed that a licensed spectrum is used as the PCell. However, the existence of a licensed spectrum may not necessarily be a precondition. The UE 100 and the eNB 200 may perform LTE communication using an unlicensed spectrum only.

In the embodiment A described above, an example in which multi-subframe scheduling is applied to LAA is described. However, multi-subframe scheduling may be applied to normal macrocell communication (that is, LTE communication on a licensed spectrum).

In the embodiment A described above, an example in which multi-subframe scheduling is applied to uplink communication (that is, PUSCH scheduling) is described. However, multi-subframe scheduling may be applied to downlink communication (that is, PDSCH scheduling).

In the embodiment A described above, the LTE system is exemplified as the mobile communication system. However, the present disclosure is not limited to the LTE system. The present disclosure may be applied to systems other than the LTE system.

(Supplementary Note 1)

(1. Introduction)

For UL transmission, multi-subframe scheduling method is supported. In this supplementary note, the multi-subframe scheduling method is proposed.

(Agreement 1)

DCI format(s) to schedule PUSCH transmission in k<=N subframes with single TB per subframe or two TBs per subframe Value(s) of N is FFS Value N is either semi-statically configured or hard-coded, to be further decided DCI format(s) will have the following scheduling information types:

Type A: common to all the scheduled subframes (appearing only once in a DCI)

carrier indicator, resource assignment, Cyclic shift for DM RS and OCC index

Type B: subframe specific information (appearing N times for N subframes scheduling)

NDI

FFS MCS is type A or type B

FFS HARQ process number and redundancy version are type A or type B

FFS details of scheduling timing indication, and whether it's type A or type B

FFS: Type C: applied only to one of the scheduled subframes (appearing only once in a DCI)

CSI request, SRS request, TPC

Note: there are may be other information fields in DCI, to be decided later

Note: the DCI formats here may not be a complete list, e.g., depending on discussion on resource allocation for PUSCH (Agreement 2)

Confirm the working assumption

The minimum latency is 4$ms$ between the subframe carrying the UL grant and subframe(s) of the corresponding PUSCH(s)

(Agreement 3)

Dynamic signaling indicates whether PUSCH in a UL subframe is transmitted from

Start of DFTS-OFDM symbol 0 or

Start of DFTS-OFDM symbol 1

FFS: Within DFTS-OFDM symbol 0

Dynamic signaling indicates whether PUSCH in a UL subframe is transmitted up to OFDM symbol 13 or OFDM symbol 12

Any combination of above options can be enabled by the dynamic signaling (2. Multi-Subframe Design)

For multi-subframe scheduling it was agreed that DCI(s) for the multiple subframe information and/or DCI(s) for single subframe information are sent in a subframe. Therefore, UE can receive one or more subframe(s) information in a subframe. The maximum number of subframe(s) information sent in each subframe is defined as N. For example, when N is configured as 2, 2 DCIs with single subframe information or 1 DCI including 2 subframes information may be sent in each subframe. In addition, the combination of DCI(s) for the multiple subframes information and DCI(s) for single subframe information is also possible. However, if multiple DCIs are transmitted simultaneously then the computational load to decode all the combination of DCIs becomes very high. Therefore, transmission of the combination of single DCI and multiple DCI to a UE sent by the eNB should not be allowed.

Proposal 1: DCI(s) for the multiple subframe information and DCI(s) for single subframe information should not be transmitted simultaneously to a UE.

In the DCI(s) for single subframe information case the UE should carry out blind decoding until N DCI(s) are successfully decoded. This computational load is equal to the legacy case when the UE decodes blindly all the candidates when the less than N DCIs are transmitted in a subframe or UE fails to decode at least one DCI due to low SINR. Therefore, maximum computational load is not different from the legacy UE process. As a result, it is assumed the method sending DCI(s) for single subframe information in each subframe does not require any enhancement.

Observation 1: Maximum computational load of sending DCI(s) for single subframe information in each subframe is equal to the legacy case.

With regards to the case of DCI(s) for multiple subframe information, UE should decode the N types of different size of DCIs since UE(s) are not aware of the DCI size corresponding to number of scheduled subframes. Therefore, the maximum computational load in a subframe will be proportional to N and if N is high, the maximum computational load becomes high as well. On the other hand, if DCI size is predefined or configured by higher layer, the maximum computational load does not increase compared with legacy process as same as DCI(s) for single subframe information case at the cost of lesser scheduling flexibility. However, UL grant transmission can be distributed into the DL burst subframe when DL burst length is more than 1 subframe. Therefore, we assume the restriction of scheduling is limited.

Proposal 2: DCI size for multiple subframe information should be predefined or configured by higher layer for not increasing the maximum computational load at the UE.

Multi-subframe information of DCI is divided into the common information to all the scheduled subframes and subframe specific information. According to the current agreement, common information for all the scheduled subframes at least includes the carrier indicator, RB assignment, cyclic-shift for DM RS and OCC index. On the other hand, subframe specific information include the NDI. The following information shown in FIG. 10 is assumed. It is considered that the DCI consists of 32 bits of information common to all subframe and 9 bits*n (n is number of subframe information in each DCI) of subframe specific information and 16 bits CRC. For example, for n=3, DCI size is 75 bits (32+9*3+16). This DCI size exceeds the limit of 72 bits for one CCE. Additionally, any other information may be applied for this DCI format. On the other hand, if two TB transmissions occur, then the DCI size would be larger since MCS and RV bits would double. As a result, the DCI size would exceed capability of aggregation level 1 (or possibly more) CCE(s). In such a case, the UE can skip blind decoding for DCIs with insufficient aggregation level or other solutions should be considered.

Proposal 3: If the DCI size exceeds capability of aggregation level 1 (or possibly more) CCE(s), UE can skip blind decoding for DCIs with insufficient aggregation level or other solutions should be considered.

Embodiment B

Embodiment B-1

Hereinafter, an embodiment in the case where the present application is applied to LTE system will be described.

(Overview of LTE System)

First, system configuration of the LTE system will be described. FIG. 1 is a configuration diagram of an LTE system.

Figure 11:
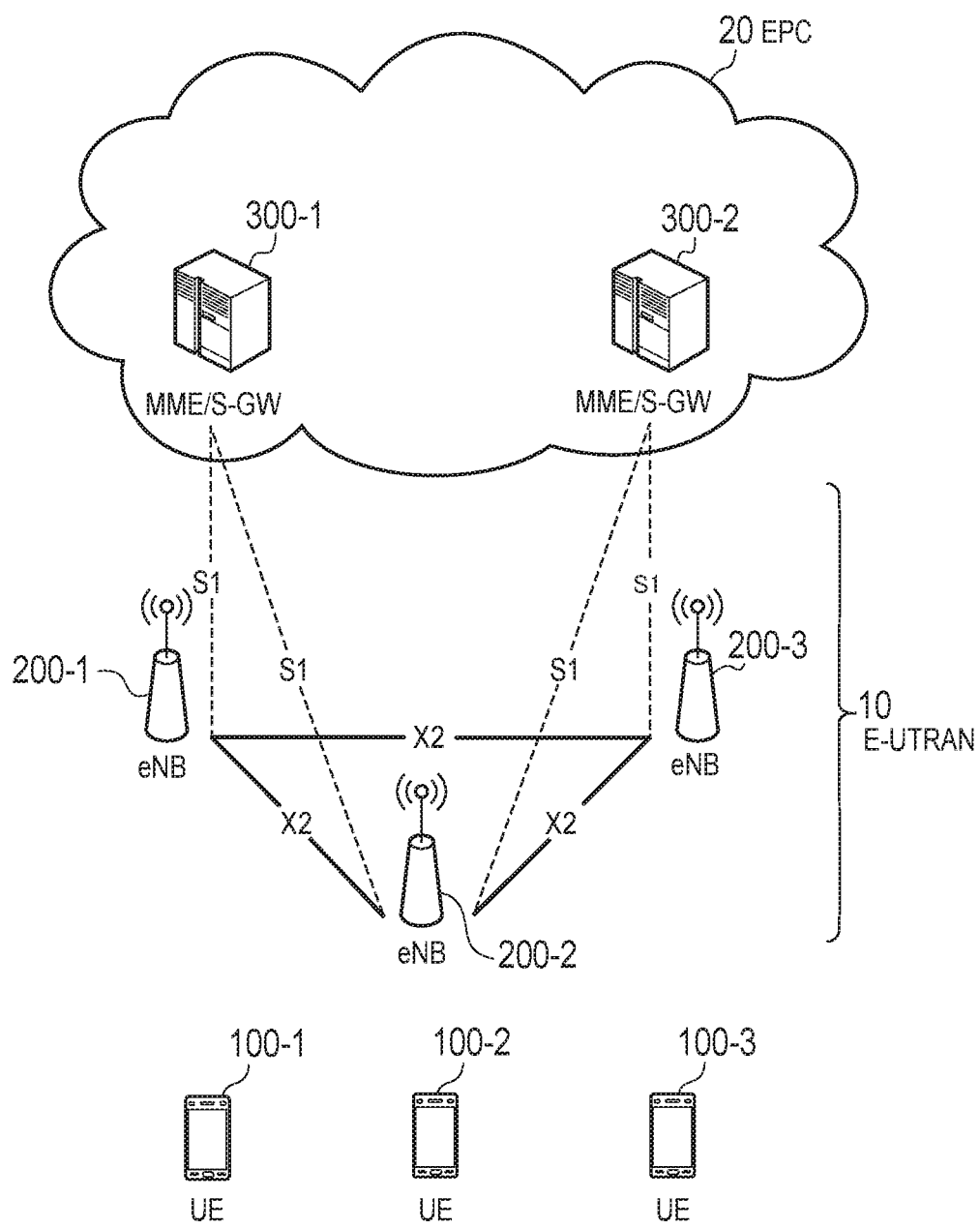
FIG. 11 is a configuration diagram of an LTE system according to an embodiment B-1 to an embodiment B-6.

As illustrated in FIG. 11, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

Figure 12:
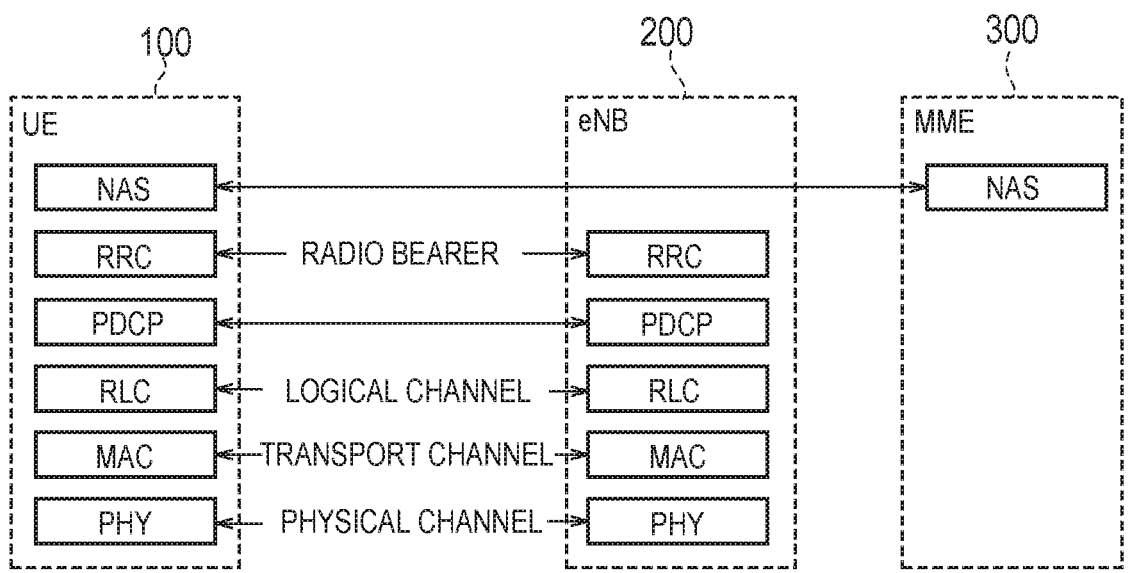
FIG. 12 is a protocol stack diagram of a radio interface according to the embodiment B-1 to the embodiment B-6.

FIG. 12 is a protocol stack diagram of a radio interface in the LTE system. As illustrated in FIG. 12, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected state, otherwise the UE 100 is in an RRC idle state.

A NAS (Non-Access Stratum) layer positioned above the RRC layer performs a session management, a mobility management and the like.

Figure 13:
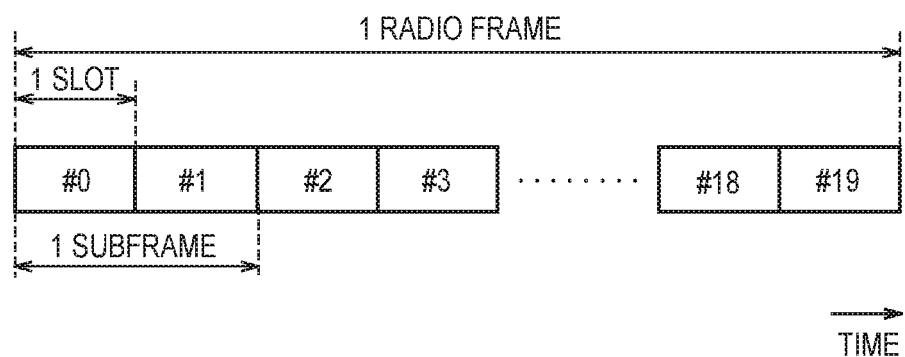
FIG. 13 is a configuration diagram of a radio frame according to the embodiment B-1 to the embodiment B-6.

FIG. 13 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 13, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, an interval of several symbols at the head of each subframe is a control region used as a physical downlink control channel (PDCCH) for mainly transmitting a control signal. The details of the PDCCH will be described later. Furthermore, the other portion of each subframe is a region available as a physical downlink shared channel (PDSCH) for mainly transmitting downlink data. Furthermore, in each subframe, a downlink reference signal such as a cell specific reference signal (CRS) is arranged.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data. Furthermore, in each subframe, an uplink reference signal such as a sounding reference signal (SRS) is arranged.

(Configuration of UE 100)

Figure 14:
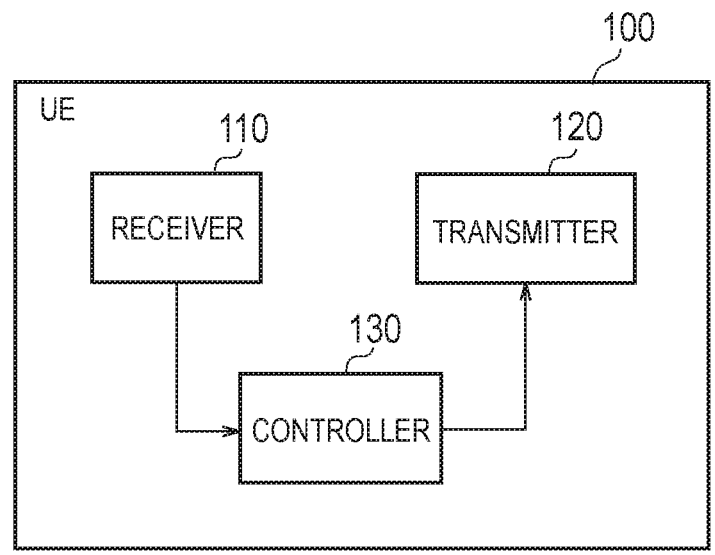
FIG. 14 is a block diagram of a UE according to the embodiment B-1 to the embodiment B-6.

In the following, the configuration of the UE 100 (radio terminal) will be described. FIG. 14 is a block diagram of a configuration of the UE 100. As illustrated in FIG. 14, the UE 100 includes a receiver 110, a transmitter 120, and a controller 130.

The receiver 110 performs various types of reception under the control of the controller 130. The receiver 110 includes an antenna and a receiving machine. The receiving machine converts a radio signal received by the antenna into a baseband signal (reception signal) and outputs it to the controller 130. The receiver 110 may include a first receiving machine for receiving a radio signal in a licensed band and a second receiving machine for receiving a radio signal in unlicensed bands.

The transmitter 120 performs various types of transmission under the control of the controller 130. The transmitter 120 includes an antenna and a transmitting machine. The transmitting machine converts a baseband signal (transmission signal) output from the controller 130 into a radio signal and transmits it from the antenna. The transmitter 120 may include a first transmitting machine for transmitting a radio signal in a licensed band and a second transmitting machine for transmitting a radio signal in an unlicensed band.

The controller 130 performs various controls in the UE 100. The controller 130 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor may include a codec for encoding/decoding audio/video signals. The processor executes various processes described later and various communication protocols described above.

The UE 100 may comprise a user interface and a battery. The user interface is an interface with a user possessing the UE 100, and includes, for example, a display, a microphone, a speaker, various buttons, and the like. The user interface receives an operation from the user and outputs a signal indicating the content of the operation to the controller 130. The battery stores electric power to be supplied to each block of the UE 100.

(Configuration of eNB 200)

Figure 15:
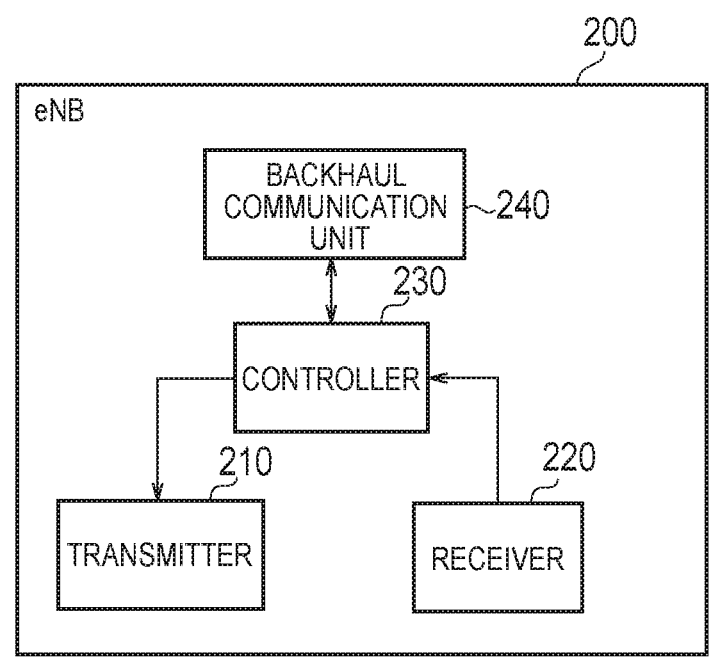
FIG. 15 is a block diagram of an eNB according to the embodiment B-1 to the embodiment B-6.

In the following, the configuration of the eNB 100 (base station) will be described. FIG. 15 is a block diagram of the eNB 200. As illustrated in FIG. 15, the eNB 200 includes a transmitter 210, a receiver 220, a controller 230, and a backhaul communication unit 240.

The transmitter 210 performs various transmissions under the control of the controller 230. The transmitter 210 includes an antenna and a transmitting machine. The transmitting machine converts a baseband signal (transmission signal) output from the controller 230 into a radio signal and transmits it from the antenna. The transmitter 210 may include a first transmitting machine for transmitting a radio signal in a licensed band and a second transmitting machine for transmitting a radio signal in an unlicensed band.

The receiver 220 performs various types of reception under the control of the controller 230. The receiver 220 includes an antenna and a receiving machine. The receiving machine converts a radio signal received by the antenna into a baseband signal (reception signal) and outputs it to the controller 230. The receiver 220 may include a first receiving machine for receiving a radio signal in a licensed band and a second receiving machine for receiving a radio signal in unlicensed bands.

The controller 230 performs various controls in the eNB 200. The controller 230 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor executes various processes described later and various communication protocols described above.

The backhaul communication unit 240 is connected to a neighbor eNB 200 via the X2 interface, and is connected to the MME/S-GW 300 via the S1 interface. The backhaul communication unit 240 is used for communication performed on the X2 interface, communication performed on the S1 interface, and the like.

(LAA)

The LTE system according to an embodiment B-1 uses, for LTE communication, not only a licensed band for which the license is granted to operators, but also an unlicensed band not requiring the license. Specifically, with an aid of the licensed band, it is possible to access an unlicensed band. Such mechanism is referred to as licensed-assisted access (LAA).

Figure 16:
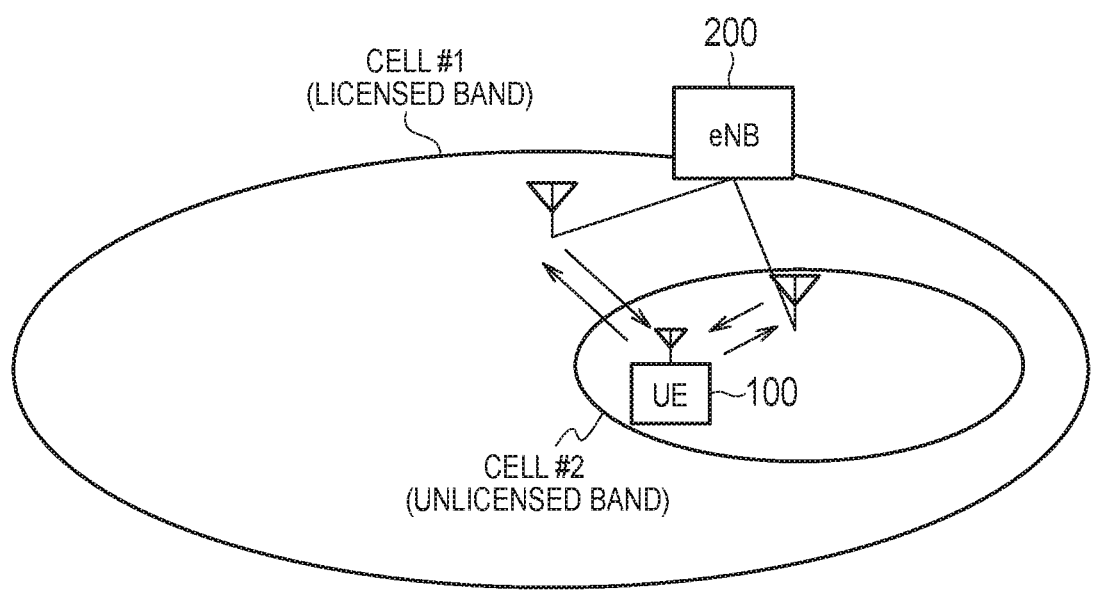
FIG. 16 is a diagram for describing LAA according to the embodiment B-1 to the embodiment B-6.

FIG. 16 is a diagram for explaining LAA. As illustrated in FIG. 16, the eNB 200 manages a cell #1 operated in a licensed band, and a cell #2 operated in an unlicensed band. In FIG. 16, an example is illustrated where the cell #1 is a macro cell and the cell #2 is a small cell, but a cell size is not limited thereto.

The UE 100 is located in an overlapping area of the cell #1 and the cell #2. The UE 100 sets the cell #1 as a primary cell (PCell), while setting the cell #2 as a secondary cell (SCell), and performs communication by carrier aggregation (CA).

In an example of FIG. 16, the UE 100 performs uplink communication and downlink communication with the cell #1 and downlink communication with the cell #2. The UE 100 may perform not only downlink communication but also uplink communication with the cell #2. Such carrier aggregation provides the UE 100 with a radio resource of the unlicensed band in addition to a radio resource of the licensed band, and thus, throughput can be improved.

In the unlicensed band, a listen-before-talk (LBT) procedure is requested to avoid interference with a system (such as a wireless LAN) different from an LTE system or an LTE system of another operator. The LBT procedure is a procedure in which it is confirmed, based on received power, whether or not a frequency channel is free, and only if it is confirmed that the frequency channel is a clear channel, the frequency channel is used.

Thus, the eNB 200 searches for a clear channel in the cell #2 (unlicensed band), and allocates a radio resource included in the clear channel to the UE 100 according to the LBT procedure (scheduling).

In the embodiment B-1, the eNB 200 performs scheduling in the cell #2 via PDCCH of the cell #2. A case of performing scheduling in the cell #2 via PDCCH of the cell #1 (that is, cross carrier scheduling) will be described in an embodiment B-3.

(Downlink Subframe, PDCCH)

Figure 17:
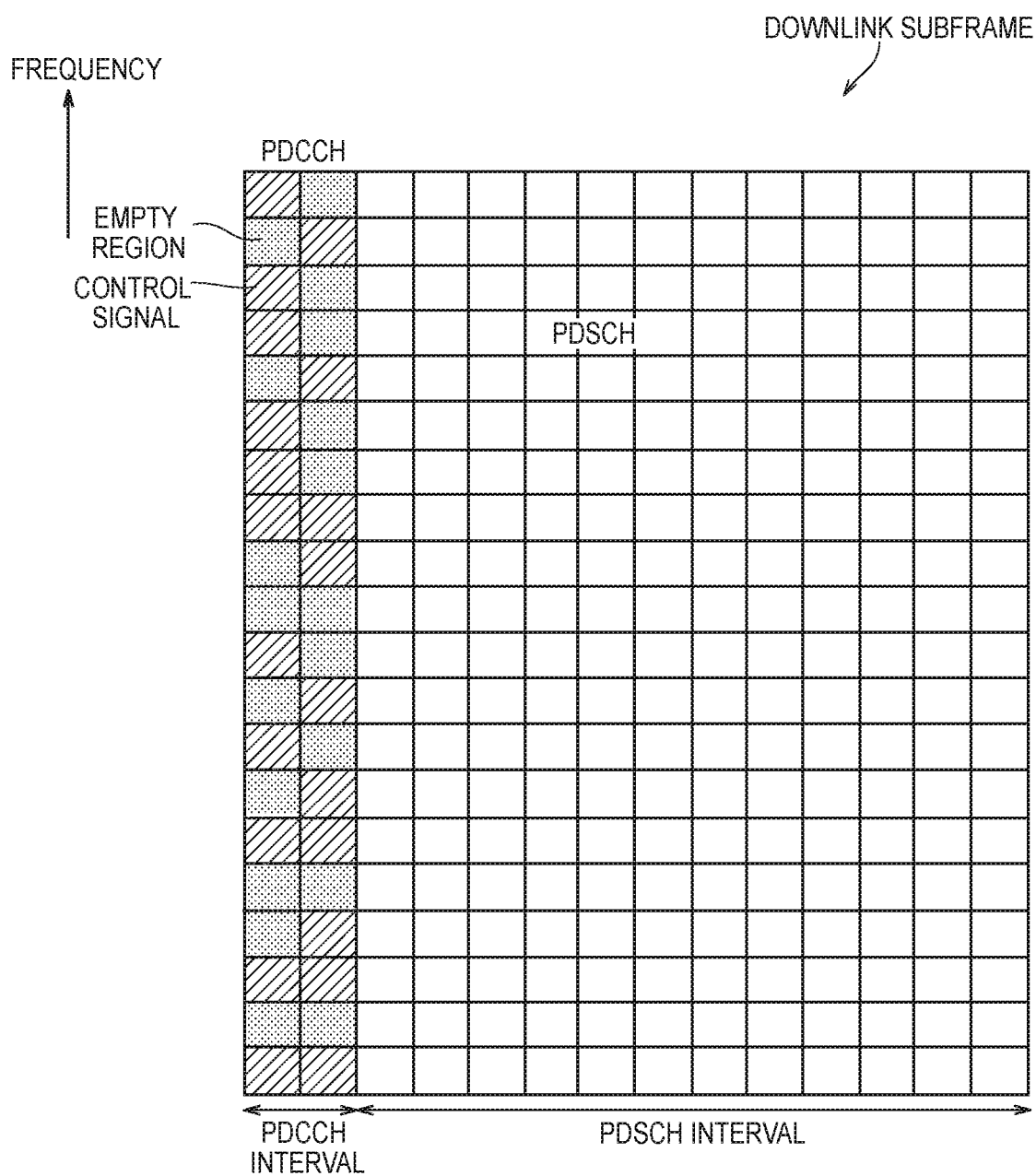
FIG. 17 is a diagram illustrating a downlink subframe according to the embodiment B-1.

FIG. 17 is a diagram illustrating a downlink subframe. As illustrated in FIG. 17, the downlink subframe includes a PDCCH interval in which a control signal (downlink control signal) is arranged and a PDSCH interval in which data (downlink data) is arranged. In FIG. 17, an example is illustrated in which the PDCCH interval has a symbol length of two symbols, but the PDCCH interval can be modified in the range of one to three symbols long.

The control signal includes scheduling information (L1/L2 control information) for notifying a resource allocation result for the downlink and the uplink. The eNB 200 includes, into the control signal, a CRC bit scrambled by an identifier (Radio Network Temporary ID: RNTI) of the UE 100 to which the control signal is transmitted to identify a UE 100 to which the control signal is transmitted. In the control signal possibly addressed to the UE 100, the UE 100 descrambles the CRC bit by the RNTI of the UE to thereby blind-decode the PDCCH to detect a control signal addressed to the UE 100.

The control signal is arranged in dispersed radio resources (resource elements). In the example of FIG. 17, the control signal is arranged in substantially a half of the resource elements of all resource elements in the PDCCH interval, and a control signal is not arranged in the remaining resource elements. A region formed of resource elements in which a control signal is not arranged is referred to as a "empty region". As described above, as a result of the control signals arranged in the PDCCH interval becoming sparse, the overall power in the PDCCH interval can decrease.

In an operation environment illustrated in FIG. 16, a case is assumed where the eNB 200 uses the downlink subframe illustrated in FIG. 17 to transmit a control signal and data on the frequency channel of the cell #2 (unlicensed band).

In this case, the power in the PDCCH interval is low, and thus, another eNB or another system may determine, according to the LBT procedure, that the frequency channel used by the eNB 200 is a clear channel. As a result, an interference occurs on the frequency channel, and thus, the eNB 200 cannot suitably perform LTE communication.

Here, in order to solve such a problem, the following operations may be considered.

In the unlicensed band, the transmitter 210 uses the downlink subframe to transmit a control signal and data. In the example in FIG. 16, the eNB 200 transmits, to the UE 100, a control signal and data on the frequency channel of the cell #2 (unlicensed band).

As described above, the downlink subframe includes the PDCCH interval in which a control signal is arranged, and the PDSCH interval in which data is arranged.

In the PDCCH interval, the controller 230 of the eNB 200 raises the transmission power of a control signal if an empty region in which a control signal is not arranged (see FIG. 17) exists. In the example of FIG. 17, the transmission power of each resource element in which a control signal is arranged in the PDCCH interval is raised. Here, "the transmission power of a control signal is raised" means that a control signal is transmitted at least with a power higher than a normal transmission power of a control signal. If an empty region exists in the PDCCH interval, the controller 230 of the eNB 200 raises the transmission power of a control signal to come close to the transmission power in the entire PDCCH interval in a case that an empty region does not exist.

However, in some countries, laws and regulations prohibit a method of raising (boosting) the transmission power of a control signal.

Therefore, in the embodiment B-1, the eNB 200 arranges a dummy signal in the empty region (see FIG. 17) to increase the power in the PDCCH interval, without raising the transmission power of a control signal.

Operation According to Embodiment B-1

An operation of the eNB 200 to suitably perform LTE communication in an unlicensed band will be described.

In an unlicensed band, the transmitter 210 of the eNB 200 according to the embodiment B-1 uses a downlink subframe to transmit a control signal and data. As described above, the downlink subframe includes the PDCCH interval in which a control signal is arranged, and the PDSCH interval in which data is arranged.

In the PDCCH interval, if there exists an empty region in which a control signal is not arranged (see FIG. 17), the controller 230 of the eNB 200 arranges a dummy signal in the empty region. In an example of FIG. 17, a dummy signal is arranged in all resource elements in which a control signal is not arranged in the PDCCH interval. However, this is not limited to a case where a dummy signal is arranged in all resource elements in which a control signal is not arranged. A dummy signal may be arranged only in some of the resource elements in which a control signal is not arranged.

As described above, by arranging a dummy signal in an empty region in the PDCCH interval, it is possible to raise the power in the PDCCH interval.

Here, the dummy signal may be a downlink synchronization signal. The downlink synchronization signal is, for example, a primary synchronization signal (PSS) and a secondary synchronization signal (SSS). A case is assumed where a new carrier structure different from the carrier structure used in the licensed band is applied to the unlicensed band. The new carrier structure is, for example, a carrier structure having a low density of downlink synchronization signals. When using such a new carrier structure, it becomes difficult to establish the downlink synchronization compared to the licensed band. Therefore, by arranging a downlink synchronization signal in an empty region in the PDCCH interval, it is possible to facilitate the establishment of downlink synchronization. Specifically, the receiver 110 of the UE 100 achieves synchronization based on a synchronization signal in the PDCCH interval while decoding a control signal in the PDCCH interval.

Alternatively, the dummy signal may be a specific downlink radio signal to which an RNTI is not applied. Generally, an RNTI (C-RNTI) is applied to a control signal to be transmitted on the PDCCH, and thus, even if a signal to which an RNTI is not applied (specific downlink radio signal) is transmitted on the PDCCH, the signal is not decoded in the UE 100. So the UE 100 is not adversely affected. The specific downlink radio signal may be a header signal or a downlink broadcast signal as described below.

Alternatively, the dummy signal may be a control signal to which an RNTI unassigned to the UE 100 is applied. The unassigned RNTI is an RNTI unassigned to each UE 100 in the cell #2 in the unlicensed band (see FIG. 16). Even if a control signal to which such an RNTI is applied is transmitted on the PDCCH, the control signal is not decoded in the UE 100, and thus, the UE 100 is not adversely affected.

Summary of Embodiment B-1

In the embodiment B-1, if an empty region exists in the PDCCH interval of a downlink subframe used in a frequency channel in an unlicensed band, the eNB 200 arranges a dummy signal in the empty region. Thereby, it is possible to raise the power in the PDCCH interval without boosting a control signal, and thus, another eNB or another system does not determine, according to the LBT procedure, that the frequency channel used by the eNB 200 is a clear channel. As a result, the eNB 200 can continue the use of the frequency channel, and the LTE communication can be suitably performed.

Embodiment B-2

An embodiment B-2 will be described with a particular focus on differences from the embodiment B-1. In the embodiment B-2, scheduling in an unlicensed band is performed by cross carrier scheduling.

(Cross Carrier Scheduling)

Figure 18:
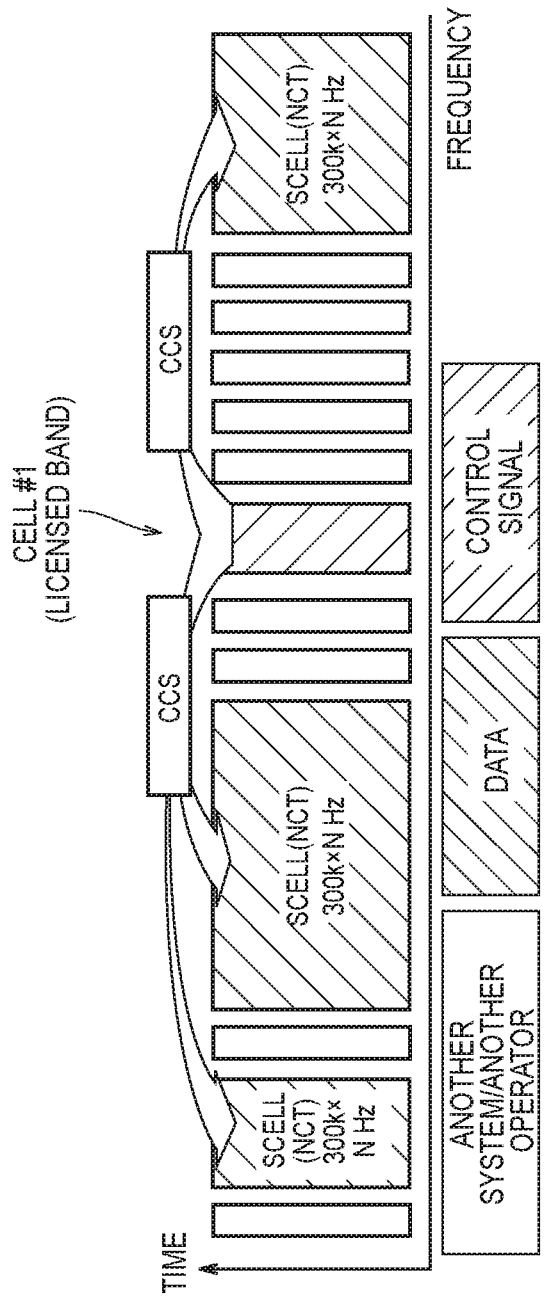
FIG. 18 is a diagram for describing cross carrier scheduling according to the embodiment B-2.

The cross carrier scheduling will be described. FIG. 18 is a diagram for describing the cross carrier scheduling.

As illustrated in FIG. 18, the cross carrier scheduling is a scheduling technique of transmitting scheduling information of another carrier (another frequency) in one carrier (one frequency).

In the example of FIG. 16, the eNB 200 transmits the control signal in the cell #2 (unlicensed band) to the UE 100 via the cell #1 (licensed band). The control signal includes scheduling information in the cell #2 (unlicensed band). The UE 100 receives data from the cell #2 in accordance with the control signal received via the cell #1.

If such cross carrier scheduling is used, the transmission of the control signal in the cell #2 (unlicensed band) may become unnecessary.

Operation According to Embodiment B-2

An operation of the eNB 200 to suitably perform LTE communication in an unlicensed band will be described.

The eNB 200 according to the embodiment B-2 is used in an LTE system in which a downlink subframe including the PDCCH interval in which a control signal is arranged and the PDSCH interval in which data is arranged is defined.

The eNB 200 includes a first transmitter configured to transmit a control signal in a licensed band (a transmitter unit #1 of the transmitter 210); and a second transmitter (a transmitter unit #2 of the transmitter 210) configured to transmit, in an unlicensed band, at least data by using a special downlink subframe. The special downlink subframe includes a specific interval corresponding to the PDCCH interval. The specific interval is an interval in which neither a control signal nor data is arranged. As described above, even if the cross carrier scheduling is used, an interval corresponding to the PDCCH interval (specific interval) is purposefully provided This maintains a format of the PDCCH interval, and thus it is possible to minimize an impact of changing the PDSCH reception operation of the UE 100.

In the specific interval, a specific downlink radio signal different from the control signal is arranged in the PDCCH interval. This enables effective use of the specific interval.

Figure 19:
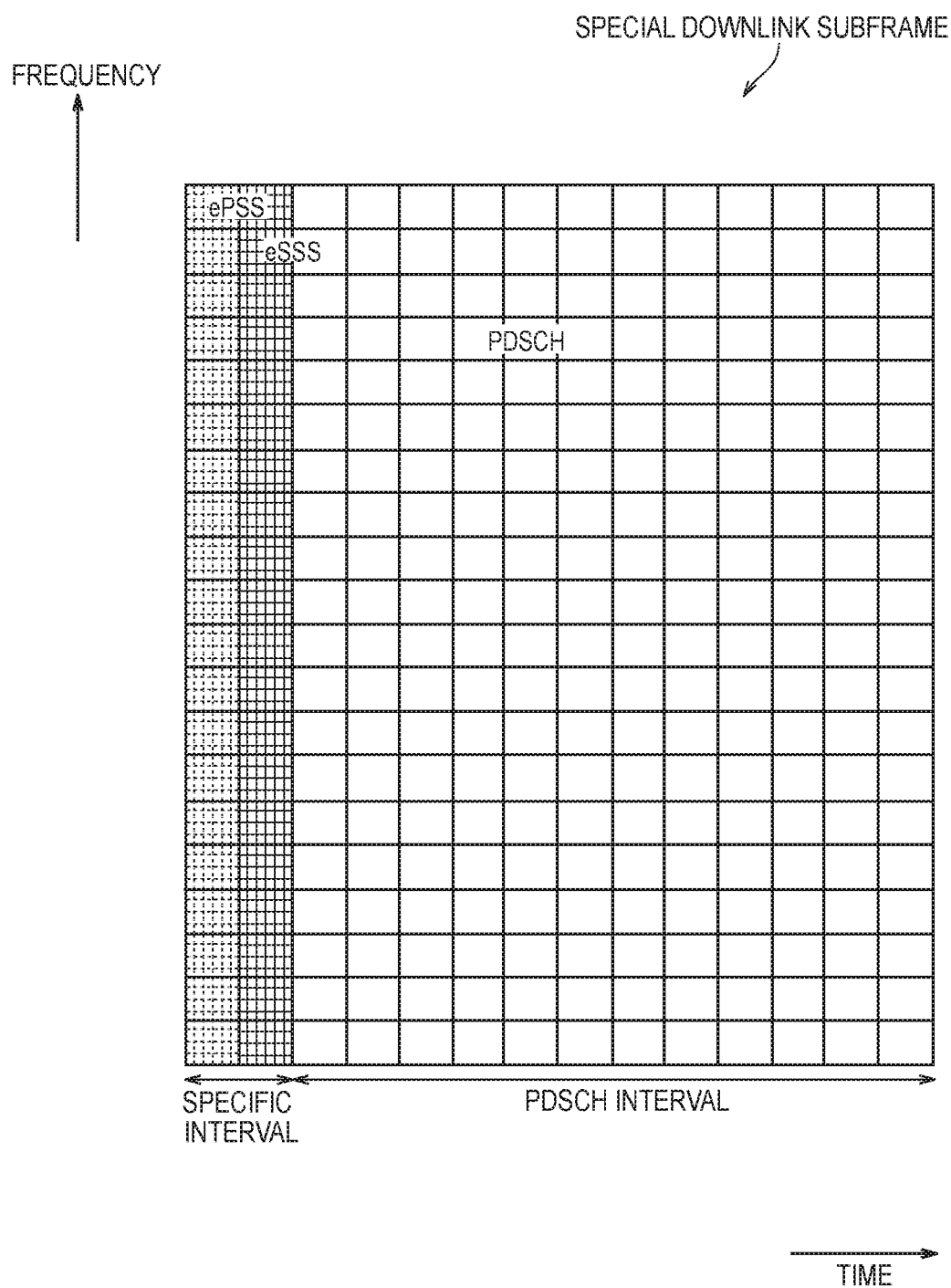
FIG. 19 is a diagram illustrating a configuration example 1 of a special downlink subframe according to the embodiment B-2.
Figure 20:
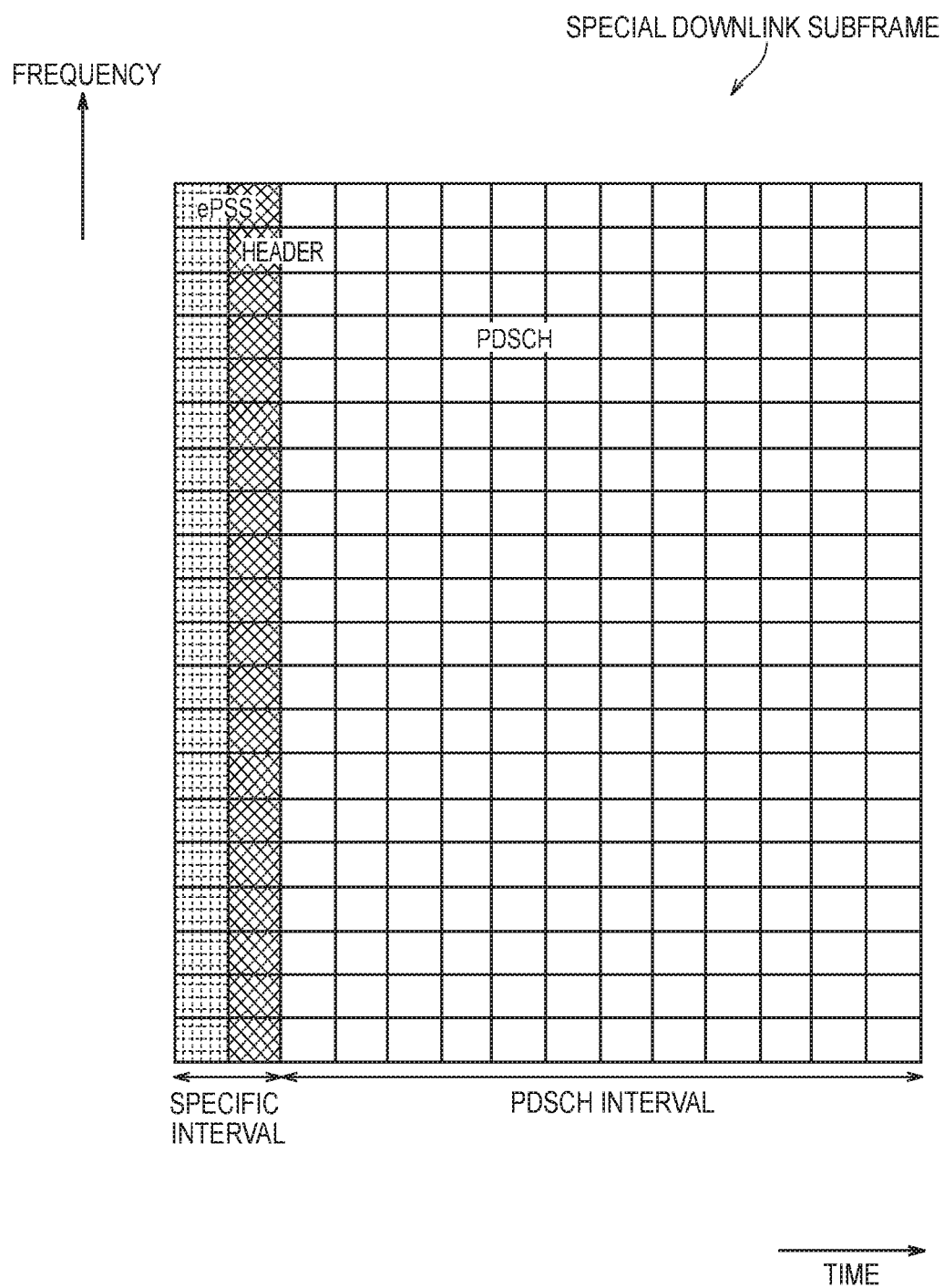
FIG. 20 is a diagram illustrating a configuration example 2 of the special downlink subframe according to the embodiment B-2.

FIG. 19 is a diagram illustrating a configuration example 1 of the special downlink subframe used in the unlicensed band. FIG. 20 is a diagram illustrating a configuration example 2 of the special downlink subframe used in the unlicensed band. Although an example of a specific interval having a symbol length of two symbols is illustrated, the specific interval can be modified in the range of one to three symbols long similarly to the PDCCH interval.

As illustrated in FIG. 19, in the configuration example 1, in the special downlink subframe, a downlink synchronization signal different from the control signal (specific downlink radio signal) is arranged in the specific interval. The downlink synchronization signal is, for example, a primary synchronization signal (PSS) and a secondary synchronization signal (SSS). A general downlink synchronization signal is arranged only in a center portion of the downlink bandwidth, but downlink synchronization signals illustrated in FIG. 19 are arranged across the entire downlink bandwidth. Therefore, such a primary synchronization signal (PSS) and a secondary synchronization signal (SSS) may be referred to as an enhanced primary synchronization signal (ePSS) and an enhanced secondary synchronization signal (eSSS). Specifically, the ePSS is arranged in a first symbol (head symbol) of the specific interval, and the eSSS is arranged in a second symbol of the specific interval.

According to such a configuration example 1 of the special downlink subframe, it is possible to facilitate the establishment of downlink synchronization.

As illustrated in FIG. 20, in the configuration example 2, in the special downlink subframe, a downlink synchronization signal and a header signal are arranged across the entire specific interval (entire band). Specifically, the enhanced primary synchronization signal (ePSS) is arranged in the first symbol (head symbol) of the specific interval and the header signal is arranged in the second symbol of the specific interval. The header signal includes scheduling information corresponding to the control signal. The header signal may include information including an allocation MCS, the number of UEs to be allocated, an allocation period, and transmission power information.

According to such a configuration example 2 of the special downlink subframe, it is possible to facilitate the establishment of the downlink synchronization, and also facilitate downlink data transmission. Specifically, the receiver 110 of the UE 100 achieves synchronization based on an ePSS in the specific interval, and at the same time, decodes a header signal in the specific interval to understand the allocation of data.

Alternatively, instead of the downlink synchronization signal and the header signal, a downlink broadcast signal may be arranged. The downlink broadcast signal is, for example, a system information block (SIB).

In both FIG. 19 and FIG. 20, it should be noted that the structure (format) of the PDSCH interval is the same as the structure of the PDSCH interval of a general subframe. Thereby, the specific interval is effectively used while maintaining the existing PDSCH structure.

Summary of Embodiment B-2

In the embodiment B-2, the eNB 200 uses a special downlink subframe in an unlicensed band. The special downlink subframe is a subframe in which a specific downlink radio signal different from a control signal is arranged in a specific interval. Thereby, the power in the specific interval is increased, and thus, another eNB or another system does not determine, according to the LBT procedure, that the frequency channel used by the eNB 200 is a clear channel. As a result, the eNB 200 can continue the use of the frequency channel, and the LTE communication can be suitably performed. Further, it is possible to effectively use the specific interval while maintaining the existing PDSCH structure.

Embodiment B-3

An embodiment B-3 will be described with a particular focus on differences from the embodiment B-1 and the embodiment B-2. The embodiment B-3 is similar to the embodiment B-2 in that a special downlink subframe is used in an unlicensed band. However, the embodiment B-3 is different from the embodiment B-2 in that cross carrier scheduling is not assumed.

Operation According to Embodiment B-3

An operation of the eNB 200 to suitably perform LTE communication in an unlicensed band will be described.

The eNB 200 according to the embodiment B-3 is used in an LTE system in which a downlink subframe including the PDCCH interval in which a control signal is arranged and the PDSCH interval in which data is arranged is defined.

In an unlicensed band, the transmitter 210 of the eNB 200 transmits at least a control signal and data by using a special downlink subframe. The special downlink subframe is a subframe in which a control signal and a specific downlink radio signal coexist in the PDCCH interval. The specific downlink radio signal is a signal different from the control signal. The specific downlink radio signal is at least one of a downlink synchronization signal, a downlink broadcast signal, and a header signal.

Figure 21:
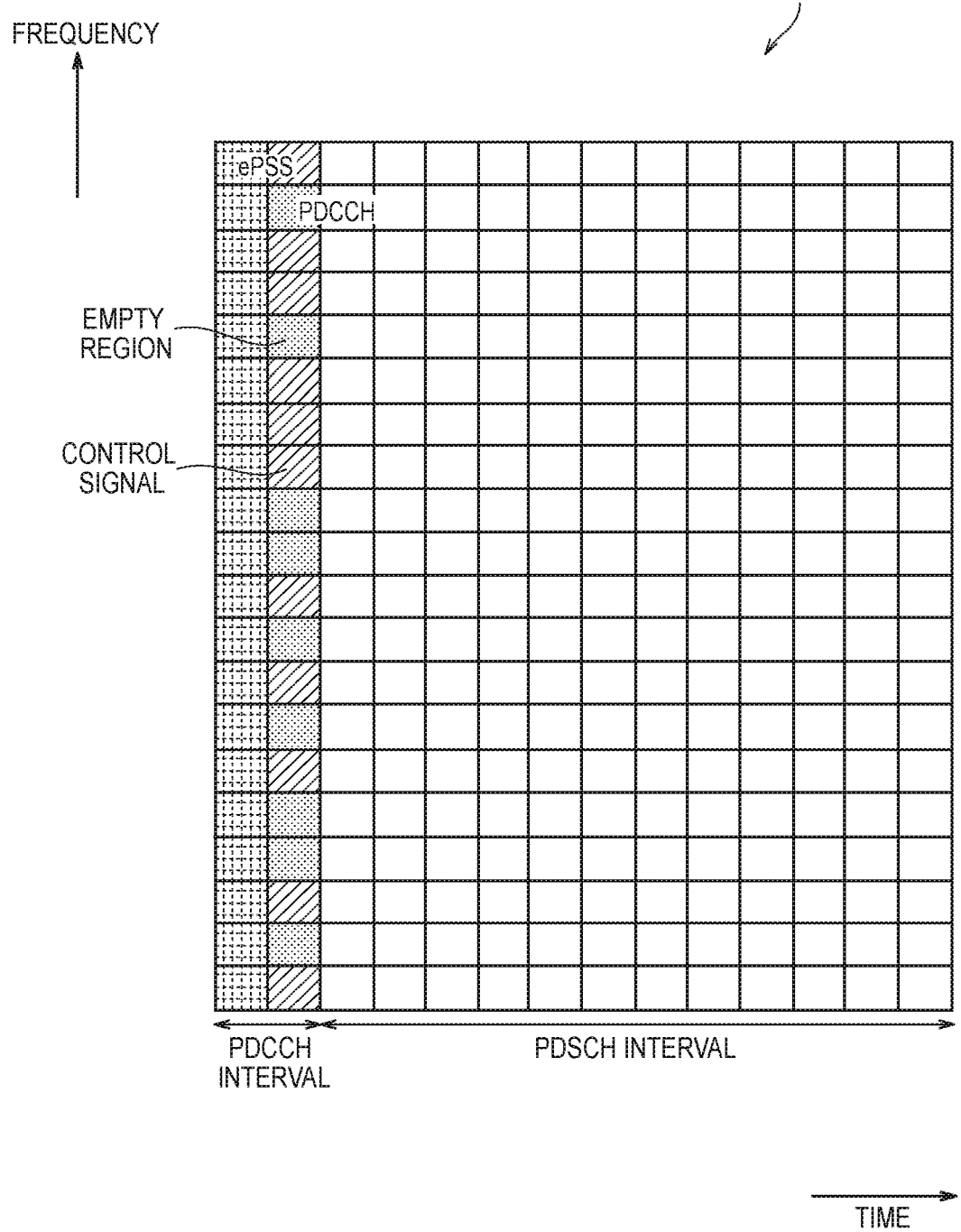
FIG. 21 is a diagram illustrating a configuration example 1 of a special downlink subframe according to the embodiment B-3.
Figure 22:
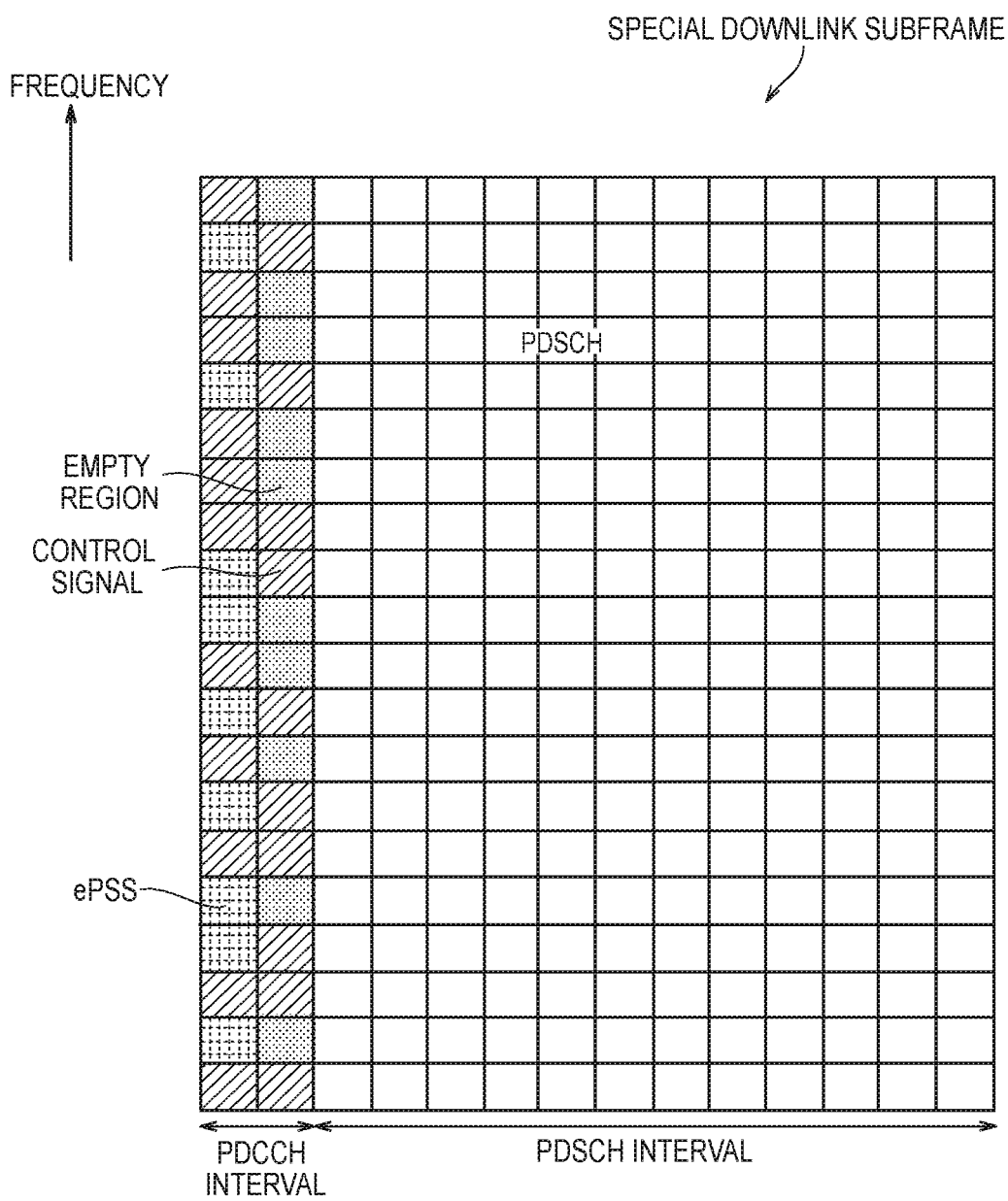
FIG. 22 is a diagram illustrating a configuration example 2 of the special downlink subframe according to the embodiment B-3.
Figure 23:
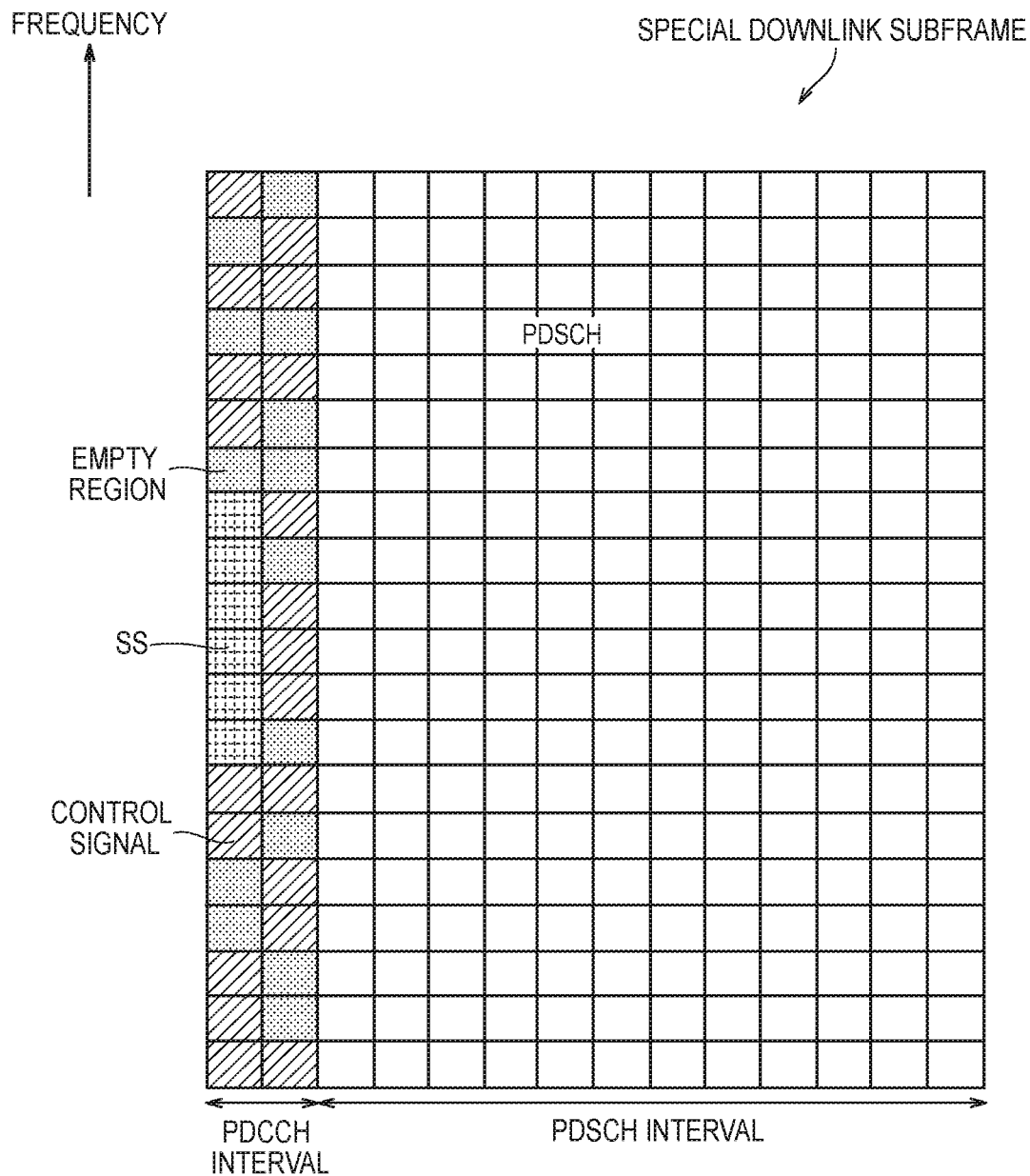
FIG. 23 is a diagram illustrating a configuration example 3 of the special downlink subframe according to the embodiment B-3.
Figure 24:
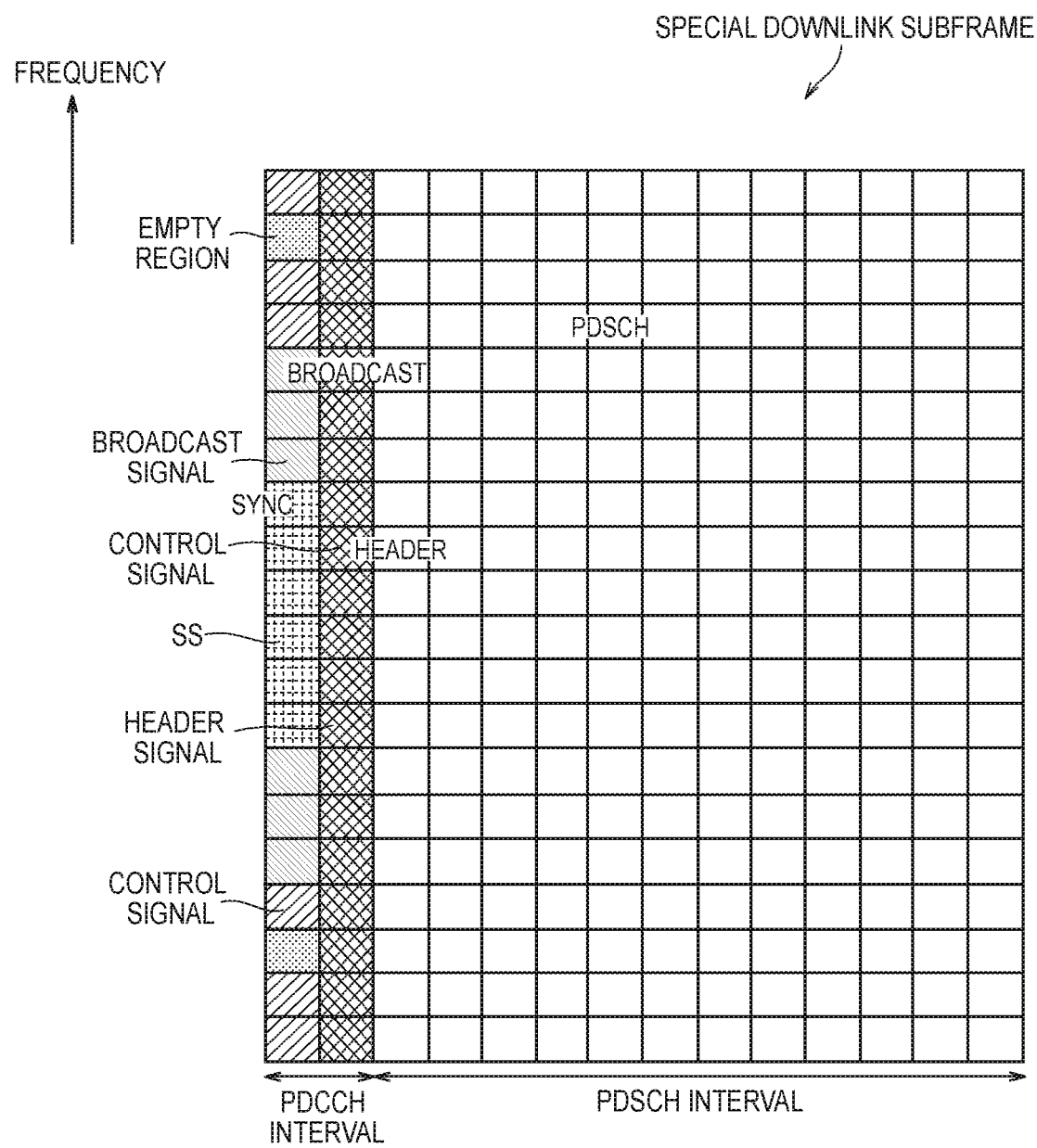
FIG. 24 is a diagram illustrating a configuration example 4 of the special downlink subframe according to the embodiment B-3.

FIG. 21 is a diagram illustrating a configuration example 1 of the special downlink subframe according to the embodiment B-3. FIG. 22 is a diagram illustrating a configuration example 2 of the special downlink subframe according to the embodiment B-3. FIG. 23 is a diagram illustrating a configuration example 3 of the special downlink subframe according to the embodiment B-3. FIG. 24 is a diagram illustrating a configuration example 4 of the special downlink subframe according to the embodiment B-3. Although an example in which the PDCCH interval having a symbol length of two symbols is illustrated, the PDCCH interval can be modified in the range of one to three symbols long.

As illustrated in FIG. 21, in the configuration example 1, an ePSS (specific downlink radio signal) is arranged in some symbol intervals of the PDCCH interval of the special downlink subframe. The ePSS is arranged across the entire frequency band of the some symbol intervals. Specifically, the ePSS (downlink synchronization signal) is arranged in the first symbol (head symbol) of the PDCCH interval, and a control signal is arranged in the second symbol of the PDCCH interval. The control signal is arranged in a resource element dispersed in a frequency direction, and thus, an empty region is generated in the second symbol interval. A dummy signal described in the embodiment B-2 may be arranged in the empty region.

As illustrated in FIG. 22, in the configuration example 2, the ePSS (specific downlink radio signal) is arranged in some symbol intervals of the PDCCH interval of the special downlink subframe. Specifically, in the first symbol (head symbol) of the PDCCH interval, the ePSS is arranged in an empty region in which the control signal is not arranged. In the second symbol of the PDCCH interval, only the control signal is arranged. The control signal is arranged in a resource element dispersed in a frequency direction, and thus, an empty region is generated in the second symbol interval. A dummy signal described in the embodiment B-2 may be arranged in the empty region.

As illustrated in FIG. 23, in the configuration example 3, an SS (specific downlink radio signal) is arranged in some symbol intervals (first symbol interval) of the PDCCH interval of the special downlink subframe. The SS is, for example, a primary synchronization signal. In the some symbol intervals (first symbol interval), the control signal and the SS are arranged in a frequency division manner. Further, in the some symbol intervals (first symbol interval), a frequency band in which the SS is arranged is defined. For example, the SS is arranged at a center portion in the frequency direction in the first symbol (head symbol) of the PDCCH interval. The control signal is arranged in an empty region in which the SS is not arranged. Only a portion to which the SS (SYNC) is not allocated may be set as a candidate allocation position of the PDCCH. PDCCH allocation may be performed without considering SYNC and then overwritten with SYNC. The control signal is arranged in a resource element dispersed in the frequency direction, and thus, the first and the second symbol intervals have an empty region. A dummy signal described in the embodiment B-2 may be arranged in the empty region.

As illustrated in FIG. 24, in the configuration example 4, in some symbol intervals (first symbol interval) of the PDCCH interval of the special downlink subframe, the control signal and specific downlink radio signals (SS and broadcast signal) are arranged in a frequency division manner. Specifically, the SS is arranged at a center portion in the frequency direction in the first symbol (head symbol) of the PDCCH interval. The broadcast signal is arranged outside the SS in the frequency direction. The control signal is arranged outside the broadcast signal in the frequency direction. The header signal is arranged across the entire frequency band in the second symbol interval of the PDCCH interval.

According to the configuration examples 1 to 3 of the special downlink subframe, it is possible to facilitate establishment of downlink synchronization and to facilitate downlink data transmission. Specifically, the receiver 110 of the UE 100 achieves synchronization based on a downlink synchronization signal in the PDCCH interval, and at the same time, decodes a control signal (and a header signal) in the PDCCH interval to understand the allocation of data.

Summary of Embodiment B-3

In the embodiment B-3, the eNB 200 uses a special downlink subframe in an unlicensed band. The special downlink subframe is a subframe in which a control signal and a specific downlink radio signal coexist in the PDCCH interval. The specific downlink radio signal includes a downlink synchronization signal. When the specific downlink radio signal is arranged in the PDCCH interval, the power in the PDCCH interval is increased, and thus, another eNB or another system does not determine, according to the LBT procedure, that the frequency channel used by the eNB 200 is a clear channel. As a result, the eNB 200 can continue the use of the frequency channel, and the LTE communication can be suitably performed. Further, it is possible to facilitate establishment of downlink synchronization and to facilitate downlink data transmission.

Modification of Embodiment B-3

FIG. 25 is a diagram illustrating a configuration example of a special downlink subframe according to a modification of the embodiment B-3. As illustrated in FIG. 25, in the PDCCH interval of the special downlink subframe, instead of the control signal, a header signal including the scheduling information corresponding to the control signal may be arranged. In the present configuration example, in the first symbol interval of the PDCCH interval of the special downlink subframe, the SS is arranged at a center portion in the frequency direction. The broadcast signal is arranged outside the SS in the frequency direction. The header signal is arranged across the entire frequency band in the second symbol interval of the PDCCH interval.

Embodiment B-4

Figure 26A:
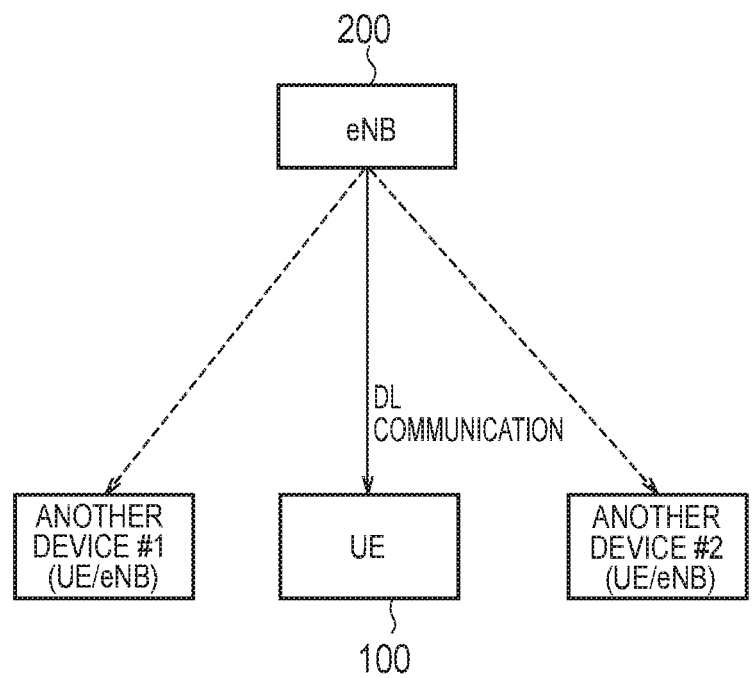
FIGS. 26A and 26B are diagrams for describing an operation according to an embodiment B-4.
Figure 26B:
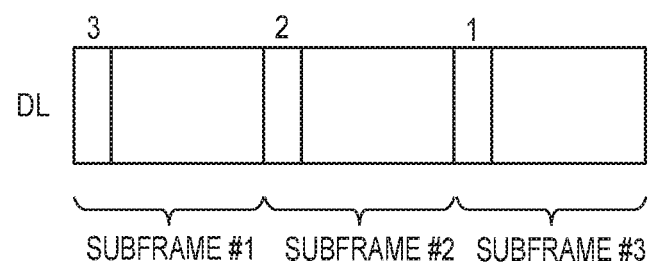

An embodiment B-4 will be described with a particular focus on differences from the embodiment B-1 to the embodiment B-3. FIGS. 26A and 26B are diagrams for describing an operation according to the embodiment B-4.

As illustrated in FIG. 26A, the eNB 200 according to the embodiment B-4 performs radio communication in a specific frequency band shared by a plurality of operators and/or a plurality of communication systems. FIG. 26A illustrates an example of the eNB 200 performing downlink communication (DL communication) with the UE 100. In the embodiment B-4, the specific frequency band is an unlicensed band. However, the specific frequency band may be a frequency band requiring a license (licensed band) and a frequency band shared by the plurality of operators and/or the plurality of communication systems.

In a case that the eNB 200 according to the embodiment B-4 performs radio communication across a plurality of subframes, the eNB 200 transmits information about the number of subframes in a target subframe from among a plurality of subframes. The information about the number of subframes is information related to the number of subframes subsequent to the target subframe from among the plurality of subframes.

As illustrated in FIG. 26B, the eNB 200, in a case that transmission is performed over a transmission period formed of a plurality of consecutive subframes (subframes #1 to #3), performs a process of transmitting the information about the number of subframes in the target subframe among the plurality of consecutive subframes. The information about the number of subframes indicates the number of subframes corresponding to a remaining transmission period. However, the information about the number of subframes may be information indicating the number of subframes in which at least the transmission is continued. If subframe information is transmitted by using a physical control format indicator channel (PCFICH) as described later, the number of bits that can be transmitted is less (for example, 2 bits). Therefore, if the transmission continues across a large number of subframes, the numbers of all the subframes corresponding to a remaining transmission period cannot be represented. Specifically, if an assumption is made that 2-bit subframe information is included in the PCFICH, a maximum number of subframes that can be notified by the subframe information is three subframes. Therefore, until there are only two subframes left to an end of the transmission period, the subframe information may notify to the effect that "transmission continues for at least three subframes".

In the embodiment B-4, the target subframe includes the first subframe among the plurality of consecutive subframes. The target subframe includes subframes other than the first subframe among the plurality of consecutive subframes.

In the example illustrated in FIG. 26B, in the first subframe #1, the eNB 200 transmits the subframe information indicating "3" as the number of subframes corresponding to the remaining transmission period. In the second subframe #2, the eNB 200 transmits the subframe information indicating "2" as the number of subframes corresponding to the remaining transmission period. Further, in the third subframe #3, the eNB 200 transmits the subframe information indicating "1" as the number of subframes corresponding to the remaining transmission period. In the examples described above, although the number of subframes included in the subframe information is calculated while also including the subframe currently being transmitted into the number; this is not always the case, and the number of subframes may be calculated while not including the subframe currently being transmitted into the number.

In the embodiment B-4, in each of the consecutive subframes #1 to #3, the eNB 200 transmits the physical control format indicator channel (PCFICH) while including the subframe information therein. The PCFICH is arranged in the head symbol interval of the downlink subframe. The general PCFICH carries information indicating the number of symbols included in the PDCCH interval. In the embodiment B-4, instead of the information about the number of symbols included in the PDCCH interval, the PCFICH carries the subframe information. In this case, the number of symbols in the PDCCH interval is fixed to any number of one to three so that the information about the number of symbols included in the PDCCH interval becomes unnecessary. Thereby, the PCFICH can transport the subframe information.

Alternatively, in addition to the information about the number of symbols included in the PDCCH interval, the PCFICH may carry the subframe information. In this case, a new PCFICH having a larger information amount than the existing PCFICH may be defined to include both the information.

The eNB 200 may transmit the PDCCH (control signal) while including the subframe information therein. It is possible to include a plurality of DCIs in a PDCCH region, and thus, upon separating PDCCH for the UE 100 (DCI) and PDCCH for another device (DCI), the UE 100 and the other device can receive the subframe information. Instead of using such individual DCIs, by using an RNTI (such as an SI-RNTI: shared information-RNTI) common to a plurality of devices including the UE 100, one DCI may be transmitted to the plurality of devices.

Alternatively, instead of the PDCCH, an enhanced PDCCH (ePDCCH) may be used. Further, the eNB 200 may transmit the header signal while including the subframe information therein. The eNB 200 may transmit the downlink broadcast signal while including the subframe information therein.

The UE 100 receives the subframe information that the eNB 200 transmits in each of the consecutive subframes #1 to #3, and the UE 100 can understand, based on the subframe information, the remaining transmission period of the eNB 200.

Devices other than the UE 100 configured to perform the downlink communication with the eNB 200 also receive the subframe information. In FIG. 26A, other devices #1 and #2 are illustrated as the other radio communication devices configured to perform radio communication in the unlicensed band. The other devices #1 and #2 are radio communication devices by the same operator as that of the eNB 200 and the UE 100. However, the other devices #1 and #2 may be radio communication devices by an operator different from that of the eNB 200 and the UE 100. Each of the other devices #1 and #2 may be an eNB or a UE.

Each of the other devices #1 and #2 receives the subframe information from the eNB 200 and understands, based on the information about the number of subframes, the remaining transmission period (that is, the channel occupancy period) of the eNB 200. Further, in the remaining transmission period of the eNB 200, each of the other devices #1 and #2 stops the operation of monitoring the unlicensed band (that is, LBT). As described above, while the eNB 200 and the UE 100 continue the downlink communication, the other devices #1 and #2 suspend the LBT (CCA) to reduce processing load and power consumption of the other devices #1 and #2.

In particular, the eNB 200 also transmits the subframe information in a subframe (subframe #2 and subframe #3) other than the first subframe #1 of the plurality of consecutive subframes #1 to #3. Thereby, the other devices #1 and #2 can receive the subframe information in any one of the subframes #2 and #3, even in a case of failure in receiving the subframe information in the first subframe #1. As a result, even if the subframe information in any of the subframes #1 to #3 is received, the other devices #1 and #2 can understand how many subframes need to pass before being released. If the subframe information is further received after receiving the subframe information from the eNB 200, another device (UE/eNB) may determine (modify) a monitoring duration based on the subframe information received most recently.

FIG. 27 is a sequence chart illustrating an example of an operation according to the embodiment B-4. Here, an example where the transmission period of the eNB 200 (channel occupancy period) is three subframes will be described.

As illustrated in FIG. 27, the eNB 200 succeeds in LBT (S101), and starts transmission (including PDSCH transmission) to the UE 100 in subframe #1 (S102). Here, the eNB 200 transmits subframe information indicating "3" as the number of subframes corresponding to a remaining transmission period. In the subframe #1, the UE 100 receives a control signal and data from the eNB 200. In the subframe #1, the UE 100 may receive subframe information from the eNB 200. Further, in the subframe #1, the other device #1 receives the subframe information. The other device #1 stops the LBT based on the subframe information (S103).

Next, in subframe #2, the eNB 200 performs transmission (including PDSCH transmission) to the UE 100 (S104). Here, the eNB 200 transmits subframe information indicating "2" as the number of subframes corresponding to a remaining transmission period. In the subframe #2, the UE 100 receives a control signal and data from the eNB 200. In the subframe #2, the UE 100 may receive the subframe information from the eNB 200. In the subframe #2, the other device #2 receives the subframe information. The other device #2 stops the LBT based on the subframe information (S105).

Next, in subframe #3, the eNB 200 performs transmission (including PDSCH transmission) to the UE 100 (S106). Here, the eNB 200 transmits subframe information indicating "1" as the number of subframes corresponding to a remaining transmission period. In the subframe #3, the UE 100 receives a control signal and data from the eNB 200. In the subframe #3, the UE 100 may receive the subframe information from the eNB 200.

Further, each of the other devices #1 and #2 resumes, based on the subframe information, the LBT after the subframe #3 passes through (S107 and S108).

In the present sequence, an example where the transmission period of the eNB 200 (channel occupancy period) is three subframes is described. However, the eNB 200 may modify the transmission period after starting the transmission. For example, the eNB 200 may modify the transmission period to four subframes or two subframes after S102. In this case, in S104 and S106, the eNB 200 transmits the subframe information based on the modified transmission period.

Modification of Embodiment B-4

In a first modification and a second modification of the embodiment B-4, after performing transmission over a transmission period (DL period) including a plurality of consecutive subframes, the eNB 200 performs reception over a reception period (UL period) including at least one subframe. The eNB 200 transmits information about the number of subframes in a target subframe of the transmission period.

Figure 28:
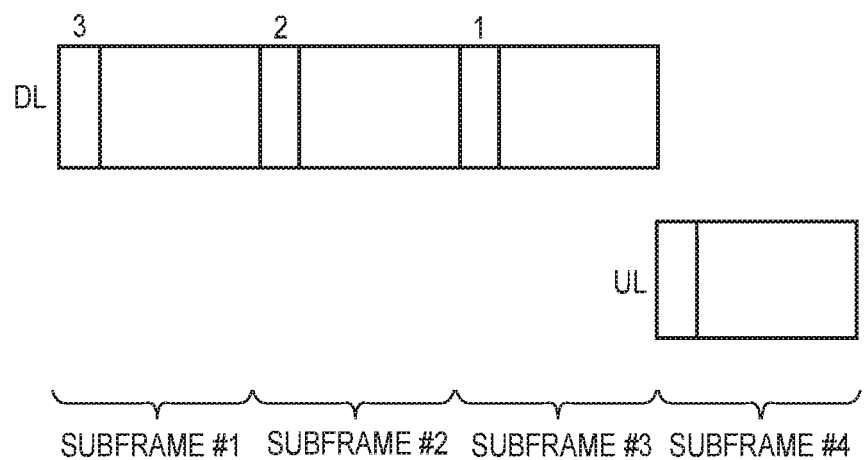
FIG. 28 is a diagram for describing an operation according to a first modification of the embodiment B-4.

A first modification of the embodiment B-4 will be described. In the first modification of the embodiment B-4, the information about the number of subframes indicates the number of subframes until the reception period (UL period) starts. FIG. 28 is a diagram for describing an operation according to a first modification of the embodiment B-4. As illustrated in FIG. 28, after performing transmission to the UE 100 over the transmission period (DL period) including the plurality of consecutive subframes #1 to #3, the eNB 200 performs reception from the UE 100 over the reception period (UL period) including the subframe #4. In each of the subframes #1 to #3, the eNB 200 transmits the information about the number of subframes indicating the number of subframes until the reception period (UL period) starts.

In the example illustrated in FIG. 28, in the first subframe #1, the eNB 200 transmits the subframe information indicating "3" as the number of subframes until the reception period (UL period) starts. Further, in the second subframe #2, the eNB 200 transmits the subframe information indicating "2" as the number of subframes until the reception period (UL period) starts. Moreover, in the third subframe #3, the eNB 200 transmits the subframe information indicating "1" as the number of subframes until the reception period (UL period) starts.

Next, a second modification of the embodiment B-4 will be described. In the second modification of the embodiment B-4, the information about the number of subframes indicates the number of subframes until the transmission period (DL period) and the reception period (UL period) end.

Figure 29:
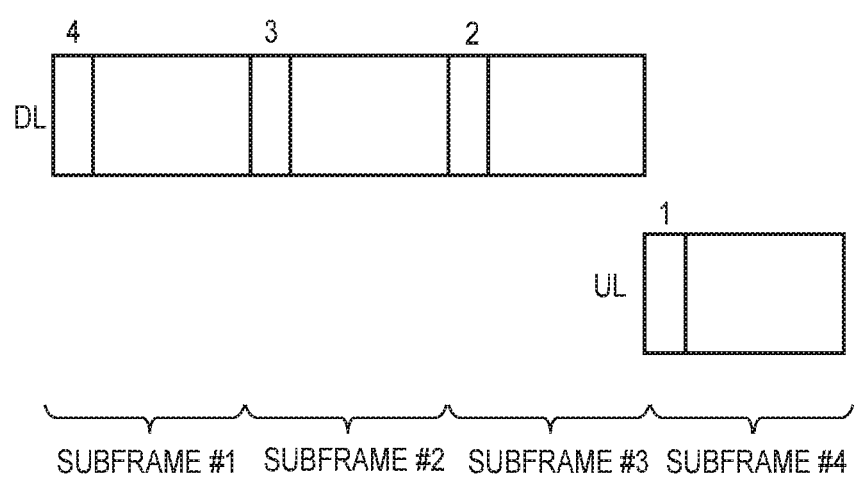
FIG. 29 is a diagram for describing an operation according to a second modification of the embodiment B-4.

FIG. 29 is a diagram for describing an operation according to the second modification of the embodiment B-4. As illustrated in FIG. 29, after performing transmission to the UE 100 over the transmission period (DL period) including the plurality of consecutive subframes #1 to #3, the eNB 200 performs reception from the UE 100 over the reception period (UL period) including the subframe #4. In each of the subframes #1 to #3, the eNB 200 transmits the information about the number of subframes indicating the number of subframes until the reception period (UL period) ends (that is, the total period including the transmission period and the reception period).

In the example illustrated in FIG. 29, in the first subframe #1, the eNB 200 transmits the subframe information indicating "4" as the number of subframes until the reception period (UL period) ends. In the second subframe #2, the eNB 200 transmits the subframe information indicating "3" as the number of subframes until the reception period (UL period) ends. In addition, in the third subframe #3, the eNB 200 transmits the subframe information indicating "2" as the number of subframes until the reception period (UL period) ends. Also, in the fourth subframe #4, the UE 100 transmits the subframe information indicating "1" as the number of subframes until the reception period (UL period) ends (in the fourth subframe #4, the eNB 200 receives the subframe information indicating "1" as the number of subframes until the reception period (UL period) ends). The UE 100 may transmit the subframe information through the PUCCH or the PUSCH, for example. The subframe information transmitted by the UE 100 may be received by the other devices (#1 and #2). However, in the fourth subframe #4, the eNB 200 may transmit the subframe information indicating "1" as the number of subframes until the reception period (UL period) ends.

FIG. 28 and FIG. 29 illustrate examples of the consecutive transmission period (DL period) and the reception period (UL period). However, the transmission period and the reception period may not be consecutive. If there exists a time interval between the transmission period and the reception period, the eNB 200 may transmit the information indicating the time interval together with the subframe information. The time interval is, for example, expressed in the number of subframes.

Embodiment B-5

An embodiment B-5 will be described with a particular focus on differences from the embodiment B-1 to the embodiment B-4. The embodiment B-5 is an embodiment in which LBT of an LBE (Load Based Equipment) scheme is mainly assumed.

The LBT has two schemes, that is, a Frame Based Equipment (FBE) scheme and a Load Based Equipment (LBE) scheme. The FBE scheme is a scheme in which a timing is fixed. On the other hand, a timing is not fixed in the LBE scheme.

Figure 30:
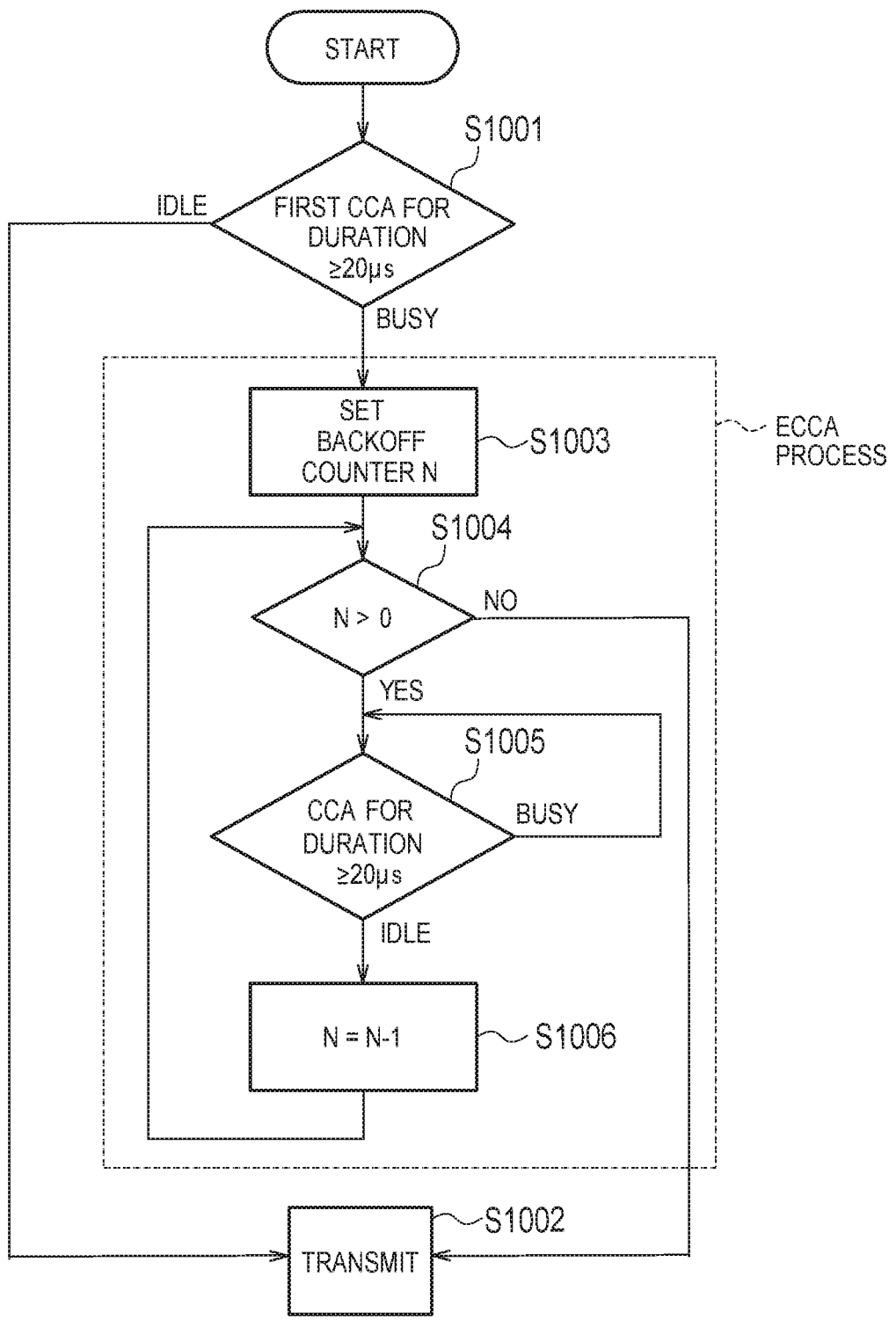
FIG. 30 is a flowchart illustrating an example of LBT of an LBE scheme.

FIG. 30 is a flowchart illustrating an example of LBT of an LBE scheme. The UE 100 and the eNB 200 execute the present flow for a target channel in an unlicensed band. Here, an example of the eNB 200 executing the present flow will be described.

As illustrated in FIG. 30, the eNB 200 monitors the target channel and determines, based on the received signal strength (interference power), whether or not the target channel is free (step S1001). Such determination is referred to as Clear Channel Assessment (CCA). Specifically, if a state in which the detected power is larger than a threshold value continues for a fixed period (for example, for 20 µs or longer), the eNB 200 determines that the target channel is busy. Otherwise, the eNB 200 determines that the target channel is free (Idle), and transmits downlink data to the UE 100 by using the target channel (step S1002).

As a result of such an initial CCA, if the target channel is determined to be busy, the eNB 200 transits to an Extended Clear Channel Assessment (ECCA) process. In the ECCA process, the eNB 200 sets a counter (N) where the initial value is N (step S1003). N is a random number from 4 to 32. The UE 100 decrements N (that is, subtracts 1) each time the CCA is successful (steps S1005 and S1006). If N reaches 0 (step S1004: No), the eNB 200 determines that the target channel is free (Idle), and uses the target channel to transmit a radio signal (step S1002).

Figure 31:
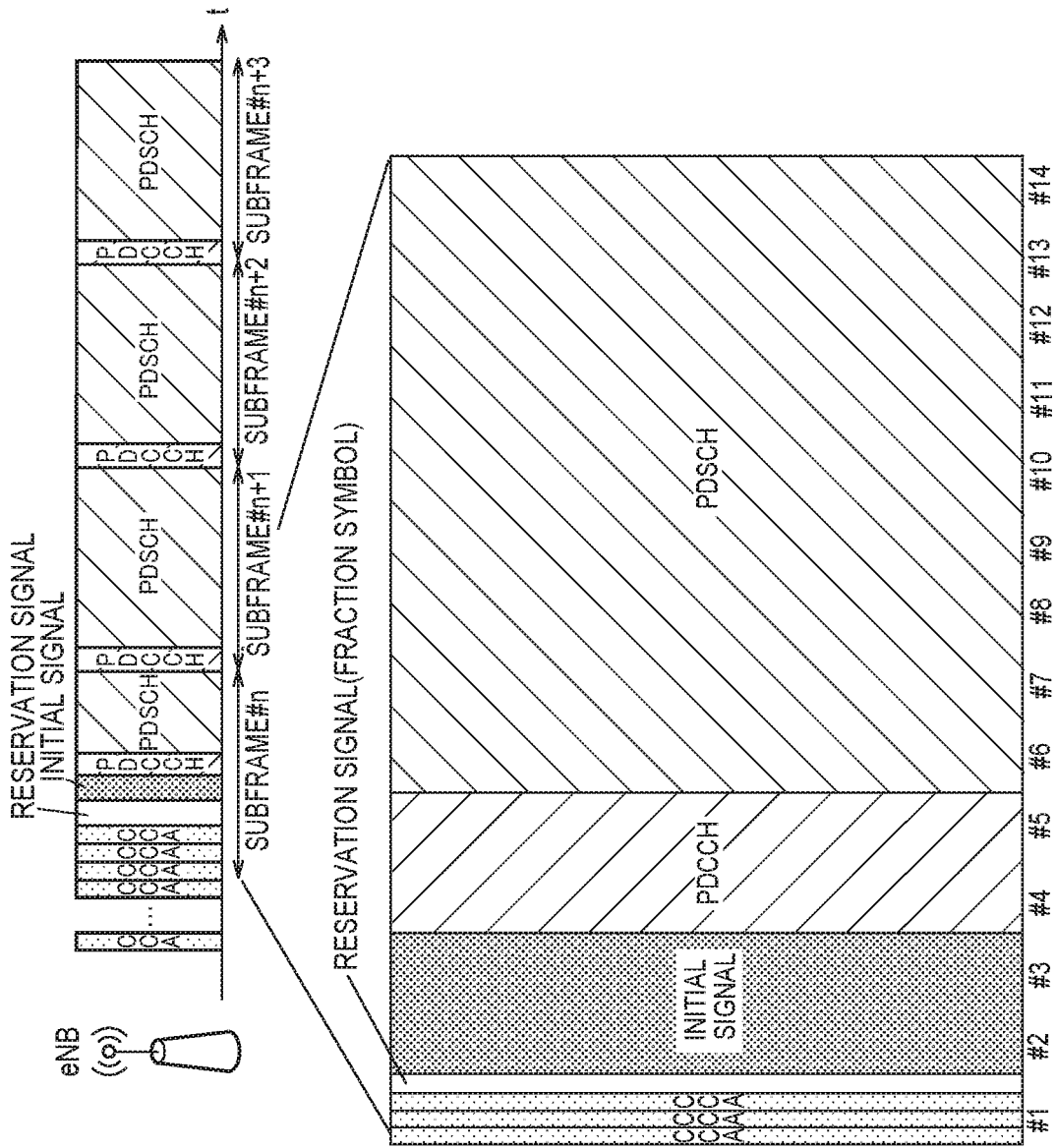
FIG. 31 is a diagram for describing a downlink transmission operation according to an embodiment B-5.

In the case of such LBT of an LBE scheme, the eNB 200 can start the transmission not only from the head subframe, but can also start the transmission from a symbol interval anywhere of the subframe. FIG. 31 is a diagram for describing a DL transmission operation according to the embodiment B-5.

As illustrated in FIG. 31, the eNB 200 starts the DL transmission after successfully performing the LBT. FIG. 31 illustrates an example of the eNB 200 successfully performing the LBT anywhere of the head symbol interval #1 of the subframe #n. The eNB 200 performs transmission in order of a Reservation Signal, an Initial Signal, a control signal (PDCCH), and data (PDSCH).

The Reservation Signal is a signal for occupying the target channel up to a point of starting the next symbol interval so that another device does not interrupt the target channel if the final CCA completion of the LBT is anywhere of the symbol interval. The Reservation Signal, for example, may be used as a cyclic prefix (CP) of the Initial Signal.

The Initial Signal is a signal for notifying the start timing of the data transmission to the UE 100. In the embodiment B-5, the Initial Signal includes predetermined control information and a synchronization signal (PSS/SSS). In the embodiment B-5, the predetermined control information includes information about the number of symbols. The predetermined control information may include the subframe information described in the embodiment B-4.

The eNB 200 according to the embodiment B-5 starts transmission (that is, transmits an Initial Signal) to the UE 100 from target symbol intervals (symbol intervals #2 and #3) of a subframe including a plurality of symbol intervals (symbol intervals #1 to #14). In this case, the Initial Signal including the information about the number of symbols is transmitted in the target symbol intervals. The information about the number of symbols is information related to the number of symbol intervals subsequent to the target symbol intervals (symbol intervals #2 and #3) of the plurality of symbol intervals (symbol intervals #1 to #14).

Thereby, even if the UE 100 receives the Initial Signal in a symbol interval other than the first symbol interval, the UE 100 can understand, based on the information about the number of symbols, the number of the remaining symbol intervals in the subframe. Therefore, the UE 100 can suitably perform the data reception.

The information about the number of symbols may be information indicating the number of symbol intervals corresponding to the data transmission intervals (PDSCH intervals). In the example illustrated in FIG. 31, the eNB 200 transmits, to the UE 100, the Initial Signal, while including the information about the number of symbols indicating "9" as the number of symbol intervals corresponding to the PDSCH intervals (symbol intervals #6 to #14) therein.

Alternatively, the information about the number of symbols may be information indicating the number of symbol intervals corresponding to the total of PDCCH intervals and PDSCH intervals. In the example illustrated in FIG. 31, the eNB 200 transmits, to the UE 100, the Initial Signal while including the information about the number of symbols indicating "11" as the number of symbol intervals corresponding to the total of PDCCH intervals and PDSCH intervals (symbol intervals #4 to #14) therein.

Alternatively, the information about the number of symbols may be information for identifying the target symbol intervals (symbol intervals #2 and #3) in which the Initial Signal is transmitted. In the example illustrated in FIG. 31, the eNB 200 transmits, to the UE 100, the Initial Signal while including the symbol numbers of the target symbol intervals (symbol intervals #2 and #3) in which the Initial Signal is transmitted therein.

Embodiment B-6

An embodiment B-6 will be described with a particular focus on differences from the embodiment B-1 to the embodiment B-5. The embodiment B-6 is an embodiment in which the above-described embodiment B-4 is applied to transmission control of a sounding reference signal (SRS).

First, the operation of the eNB 200 according to the above-described embodiment B-4 and a modification thereof can be summarized as follows. The eNB 200 performs radio communication with the UE 100 in a specific frequency band shared by a plurality of operators and/or a plurality of communication systems. The eNB 200 performs downlink transmission across a plurality of consecutive subframes. The eNB 200 transmits DCI to the UE 100 in a target subframe among the plurality of consecutive subframes. The DCI includes subframe information concerning subframes subsequent to the target subframe among the plurality of consecutive subframes. Specifically, the subframe information indicates the number of subframes corresponding to a remaining downlink transmission period. Alternatively, the subframe information indicates the last subframe among the plurality of consecutive subframes.

The uplink transmission of the UE 100 includes the transmission of the SRS (see the embodiment B-1). The eNB 200 receives the uplink transmission after performing transmission across a plurality of consecutive subframes.

The operation of the UE 100 according to the above-described embodiment B-4 and the modification thereof can be summarized as follows. The UE 100 performs radio communication with the eNB 200 in a specific frequency band shared by a plurality of operators and/or a plurality of communication systems. UE 100 receives, from the eNB 200 performing downlink transmission in a specific frequency band across a plurality of consecutive subframes, DCI in a target subframe among a plurality of subframes. The DCI includes subframe information concerning subframes subsequent to the target subframe among the plurality of consecutive subframes.

In the embodiment B-6, such an operation is applied to transmission control of an SRS (specifically, an asynchronous SRS). The asynchronous SRS (Aperiodic SRS) is an SRS which the UE 100 transmits singularly in response to an instruction from the eNB 200.

The DCI according to the embodiment B-6 includes subframe information and a transmission instruction of the SRS. The transmission instruction of the SRS may be referred to as an "SRS trigger". The subframe information indicates a specific subframe (specific timing) in which the UE 100 should transmit the SRS. The specific subframe is the last subframe among the plurality of consecutive subframes. The UE 100 transmits the SRS to the eNB 200 in a specific subframe based on the DCI.

A predetermined DCI format may be applied to the DCI. The predetermined DCI format may be the DCI format for the transmission instruction of the SRS.

The DCI according to the embodiment B-6 can have the following variations.

The DCI includes the subframe information, the transmission instruction of the SRS, and a DL grant, and does not include a UL grant. The DL grant corresponds to scheduling information for allocating a downlink resource (PDSCH resource). The UL grant corresponds to scheduling information for allocating an uplink resource (PUSCH resource).

The DCI includes the subframe information, the transmission instruction of the SRS, and the UL grant, and does not include the DL grant.

The DCI includes the subframe information, the transmission instruction of the SRS, the DL grant, and the UL grant.

The DCI includes the subframe information and the transmission instruction of the SRS, and does not include the DL grant and the UL grant. That is, such DCI does not include the scheduling information.

However, the DCI may include the transmission instruction of the SRS without including the subframe information. The DCI may include the transmission instruction of the SRS without including the subframe information and the scheduling information.

Figure 32:
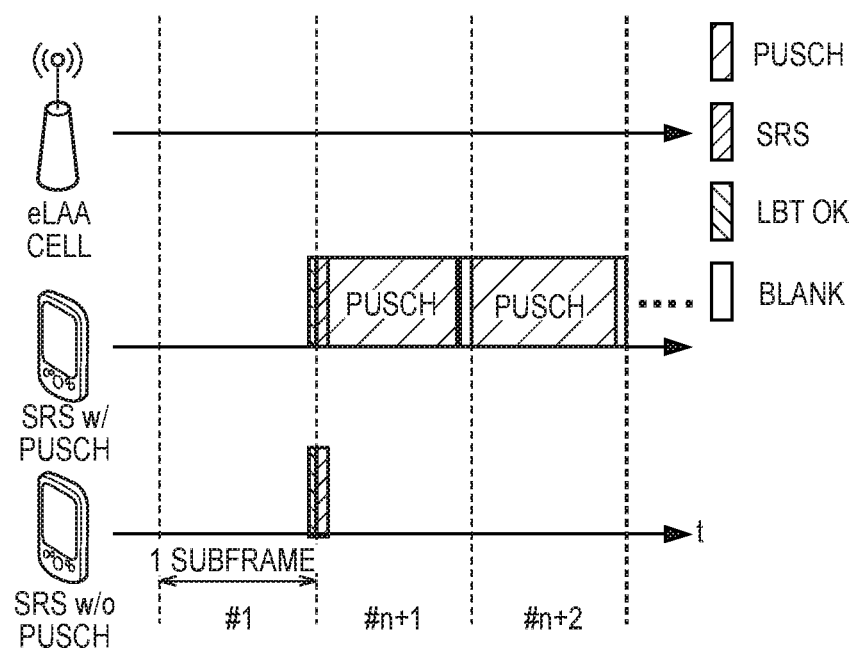
FIG. 32 is a diagram illustrating an operation example of SRS transmission according to an embodiment B-6.

FIG. 32 is a diagram illustrating an operation example of SRS transmission according to the embodiment B-6.

In FIG. 32, an "eLAA Cell" is a cell (eNB) operated in an unlicensed band (unlicensed spectrum). The "eLAA Cell" receives the SRS transmitted from the UE. As illustrated in FIG. 32, the SRS transmission includes a case with transmission of the PUSCH (SRS w/PUSCH), and a case without transmission of the PUSCH (SRS w/o PUSCH).

In the case of SRS w/PUSCH, the UE performs the LBT in the subframe #n and transmits the SRS at the end of the subframe #n in response to success (OK) in the LBT. Then, the UE performs the PUSCH transmission in the subframes #(n+1), #(n+2), . . . . The last portion of subframes #(n+1), #(n+2) . . . is set to Blank without performing the PUSCH transmission.

In the case of SRS w/o PUSCH, the UE performs the LBT in the subframe #n and transmits the SRS at the end of the subframe #n in response to success (OK) in the LBT. The UE does not perform the PUSCH transmission in the subframes #(n+1), # (n+2)

Figure 33:
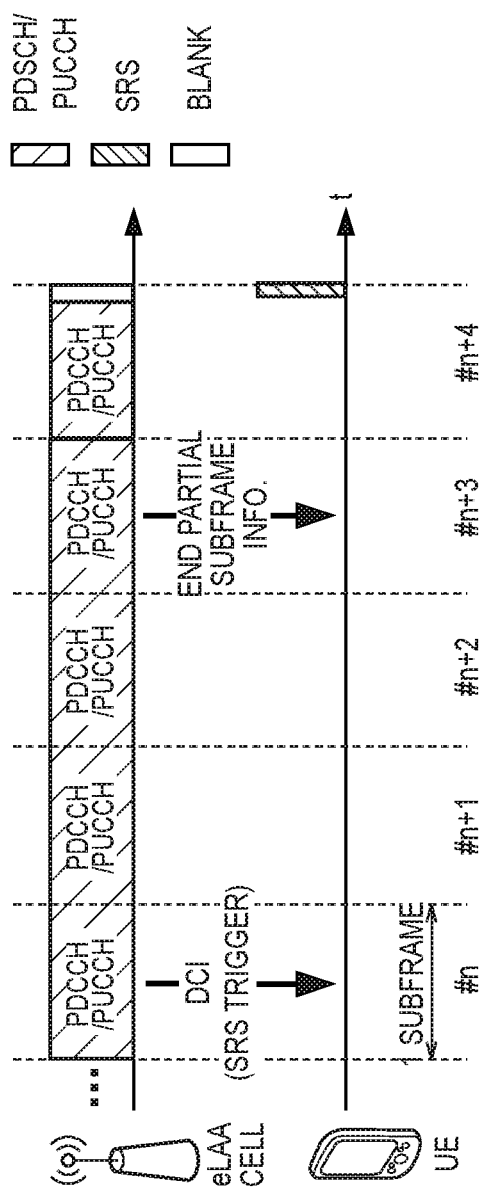
FIG. 33 is a diagram illustrating an operation according to the embodiment B-6.

FIG. 33 is a diagram illustrating an operation according to the embodiment B-6.

As illustrated in FIG. 33, the eLAA Cell (eNB) transmits the DCI to the UE in the subframe #n. The DCI includes a transmission instruction of the SRS (SRS trigger). The DCI includes subframe information indicating a specific subframe in which the UE should transmit the SRS. In FIG. 33, a specific subframe is subframe # (n+4). The UE, based on the subframe information, identifies the subframe #(n+4) in which the UE should transmit the SRS. Then, the UE transmits the SRS to the eLAA Cell (eNB) in the last portion of the subframe #(n+4). The eLAA Cell (eNB) sets the last portion of the subframe #(n+4) as blank (that is, to an unallocated state), and receives the SRS from the UE by using the blank portion. The eLAA cell (eNB) performs uplink channel estimation or the like based on the received SRS.

In a general LTE system, the transmission timing of the Aperiodic SRS is determined by the SRS trigger and an upper layer setting parameter. The upper layer setting parameter is a parameter set by RRC signaling from the eNB 200 to the UE 100. Upon receiving the DCI including the SRS trigger, the UE 100 transmits the Aperiodic SRS at a timing satisfying the setting calculated from the upper layer setting parameter, 4 ms after the reception of the DCI.

Therefore, even if the subframe information (SRS transmission timing) according to the embodiment B-6 is included in the DCI together with the SRS trigger, there is a possibility that the Aperiodic SRS cannot be transmitted due to the restrictions on the upper layer setting parameter.

Thus, the UE 100 according to the embodiment B-6, in response to the reception of the DCI including the subframe information (SRS transmission timing) and the instruction to transmit the SRS (SRS trigger), ignores the upper layer setting parameter related to the SRS transmission timing. In other words, the UE 100, upon receiving the instruction to transmit the SRS and the transmission timing of the Aperiodic SRS together, does not receive the upper layer (RRC) restriction.

The embodiment B-1 to the embodiment B-6 described above are not limited to a case where they are separately and independently carried out. Two or more embodiments among the embodiment B-1 to the embodiment B-6 described above may be carried out in combination thereof.

In the embodiment B-4 and the embodiment B-5 described above, the uplink communication is not specifically mentioned. However, the operations according to the embodiment B-4 and the embodiment B-5 can also be applied to the uplink communication. Specifically, in the embodiment B-4 and the embodiment B-5, the eNB 200 may be replaced with the UE 100, and the UE 100 may be replaced with the eNB 200.

In the embodiment B-1 to the embodiment B-6 described above, an example where an identical eNB 200 manages the cell #1 (licensed band) and the cell #2 (unlicensed band) is described. However, the present disclosure can also be applied to a case in which different eNBs 200 manage the cell #1 (licensed band) and the cell #2 (unlicensed band).

In the embodiment B-1 to the embodiment B-6 described above, an LTE system is exemplified as the mobile communication system. However, the present disclosure is not limited to the LTE system. The present disclosure may be applied to systems other than the LTE system.

[Supplementary Note 2]

(1. Introduction)

Enhanced LAA was approved. Many aspects of SRS design are agreed. In this supplementary note remaining issues and solutions are proposed.

(Agreement 1)

Support of SRS transmissions on LAA SCell is recommended for LAA UL

For a UE, SRS transmission with PUSCH is supported

FFS if SRS transmission without PUSCH is supported

If supported, FFS whether with or without LBT (Agreements 2)

Aperiodic SRS transmission with PUSCH is supported in eLAA

Enhancements of aperiodic SRS transmission and/or triggering are not precluded

FFS: Aperiodic SRS transmission without PUSCH (Agreements 3)

Working assumption: Periodic SRS without PUSCH is NOT supported in Rel-14 eLAA WI A-periodic SRS without PUSCH is supported at least in DL ending partial subframes in Rel-14 eLAA WI FFS the case of UL subframes LBT for aperiodic SRS without PUSCH 25 us one-shot LBT within eNB MCOT;

Cat 4 LBT outside of eNB MCOT

FFS contention window size parameters, including possibility of non-adapting contention window size FFS no LBT if SRS is transmitted within 16 us of the DL transmission within eNB MCOT FFS whether or not the eNB can indicate a LBT type (Agreements 4)

Aperiodic SRS without PUSCH can be triggered by dynamic signaling at least via DL grants UE is configured by RRC one or more sets of SRS parameters The configuration details are FFS FFS other possible triggering mechanisms, e.g.:

Group DCI

UE-specific DCI

One or several of the above options may apply (Agreements 5)

Only wideband SRS transmission in supported in eLAA

Existing max #SRS RBs for a given system bandwidth is the baseline

FFS whether or not to extend/shift to # of RBs>max #RBs in the legacy case

Working assumption: SRS is based on legacy comb structure

As a baseline, comb=2 and 4

FFS whether or not support different comb value(s)

(Agreements 6)

SRS, if present in a UL subframe, is transmitted at the end of the subframe (2. SRS Design)

Consideration related to SRS comb structure, SRS position and the triggering of the aperiodic SRS without PUSCH are shown.

SRS Comb Structure

As mentioned in the above working assumption, reusing the legacy comb structure is agreed as baseline. In general, maximum number of SRS multiplexing is limited by the number of configurable cyclic shift and comb at the same time. According to the number of cyclic shift and comb, the maximum number of multiplexing is 32 (8*4) in the current system which is outcome of Rel.13 EB/FD-MIMO discussion. Therefore, the current SRS multiplexing number is sufficient.

Proposal 1: Confirm the working assumption that legacy comb structure and values should be reused.

Position of the SRS Symbols

It is discussed whether to support the aperiodic SRS without PUSCH at the first available OFDM symbol or not. Motivation to support this method is to increase the number of opportunities for SRS transmissions. According to the current agreement, SRS transmission is limited in the case when there is PUSCH transmission or DL partial subframe. The transmissions of the SRS should not be limited by the limitation of the number of opportunities available to transmit in the unlicensed band. Therefore, SRS without PUSCH at the first OFDM symbol should be supported as well. In addition, if the aperiodic SRS without PUSCH is supported then the aperiodic SRS with PUSCH at first available OFDM symbol should be supported as well. This is supported to allow multiplexing of SRS with PUSCH and SRS without PUSCH. In order to support such a scheme the eNB has to transmit the indication of SRS position.

Proposal 2: Aperiodic SRS without PUSCH and aperiodic SRS with PUSCH at the first available OFDM symbol should be supported.

Aperiodic SRS Trigger Without PUSCH

In the legacy SRS transmission, when UE receives the SRS trigger, UE transmits the SRS after at least 4 ms. Similarly, in eLAA UE also should receive the SRS trigger at least 4 ms before the end of the partial subframe. According to the above agreement, SRS trigger is transmitted with DL grant. However, UE(s) receiving only the DL grant with SRS trigger is not aware which subframe is end partial subframe since current DL grants does not include the end partial subframe information. Only when UE receives a DCI format 1C including next subframe length, the UE(s) becomes aware of the SRS transmission timing. In this situation, preparation time for SRS is only about 1 or 2 ms after receiving a DCI format 1C (FIG. 2) unless the UE beforehand prepares all the candidates of SRS sequence resulting in higher UE processing and a larger buffer. In order to have sufficient time for the UE to transmit the SRS, the DL grant should include the position of the end partial subframe or rest of transmission burst length with SRS trigger. On the other hand, the triggering of the aperiodic SRS without PUSCH at first OFDM symbol also should include at least subframe timing. In addition, the cyclic shift information and comb parameter should be indicated if eNB has an intention to dynamically change the SRS configuration.

Proposal 3: DCI for aperiodic SRS trigger should include at least the SRS transmission timing.

Additionally, if the UE follows the legacy higher layer signaling and unable to satisfy the higher layer setting in the end partial subframe then the UE cannot transmit the SRS in the end partial subframes regardless of receiving the SRS trigger. Therefore, if UE send the aperiodic SRS without PUSCH in the end partial subframe, the UE should only follow the SRS timing indicated by DCI.

Proposal 4: If UE send the aperiodic SRS without PUSCH in the end partial subframe, UE should only follow the SRS timing indicated by DCI.

According to the above working assumption, aperiodic SRS is triggered at least by DL grant; however, DL scheduling information is an overhead if the eNB wants only send the trigger for the aperiodic SRS w/o PUSCH. Additionally, periodic SRS transmission currently is not supported in Rel.14 LAA. Therefore, aperiodic SRS transmission will be used to send both periodic and aperiodic SRS transmissions. As a consequence the legacy DCI may not have sufficient capacity to handle the increased number of SRS requests. Therefore, a new DCI format (e.g., include only SRS trigger information) should be considered. If further enhancement is needed, RAN1 should also consider the grouping of DCI or common DCI as other alternatives.

Proposal 5: New DCI should be defined, if reduction of DCI overhead is needed.

INDUSTRIAL APPLICABILITY

The present disclosure is useful in the mobile communication field.

The invention claimed is:

1. A communication method comprising:
   generating, by a base station, a user equipment specific control message including radio resource configuration of a user equipment;
   segmenting, by the base station, the generated user equipment specific control information into a plurality of segments in response to a size of the generated user equipment specific control message exceeding a threshold value; and
   transmitting, by the base station, the plurality of segments to the user equipment, wherein
   the transmitting comprises transmitting information indicating a number of the plurality of segments by dedicated Radio Resource Control (RRC) signaling.

2. A user equipment comprising:
   a processor and a memory coupled to the processor, the processor is configured to perform processes of:
   receiving, from a base station, a plurality of segments of a user equipment specific control message including radio resource configuration of a user equipment, the receiving comprising receiving information indicating a number of the plurality of segments by dedicated Radio Resource Control (RRC) signaling, wherein the user equipment specific control message is segmented into the plurality of segments by the base station in response to a size of the user equipment specific control message exceeding a threshold value; and
   acquiring the user equipment specific control message based on the received plurality of segments.

3. A base station comprising a processor and a memory coupled to the processor, the processor is configured to perform processes of:
   generating a user equipment specific control message including a radio resource configuration of a user equipment;
   segmenting the generated user equipment specific control information into a plurality of segments in response to a size of the generated user equipment specific control message exceeding a threshold value; and
   transmitting, by the base station, the plurality of segments to the user equipment, wherein
   the transmitting comprises transmitting information indicating a number of the plurality of segments by dedicated Radio Resource Control (RRC) signaling.

* * * * *